US011803689B2

(12) United States Patent
Zhang et al.

(10) Patent No.: US 11,803,689 B2
(45) Date of Patent: Oct. 31, 2023

(54) SYSTEM AND METHOD FOR DOSSIER CREATION WITH RESPONSIVE VIEW HANDLING FOR FREE-FORM LAYOUT

(71) Applicant: MicroStrategy Incorporated, Tysons Corner, VA (US)

(72) Inventors: Yiqi Zhang, Zhejiang (CN); Wei Jiang, Zhejiang (CN); Mengyuan Guan, Zhejiang (CN)

(73) Assignee: MICROSTRATEGY INCORPORATED, Tysons Corner, VA (US)

( * ) Notice: Subject to any disclaimer, the term of this patent is extended or adjusted under 35 U.S.C. 154(b) by 0 days.

(21) Appl. No.: 16/985,412

(22) Filed: Aug. 5, 2020

(65) Prior Publication Data

US 2022/0043960 A1 Feb. 10, 2022

(51) Int. Cl.
*G06F 40/106* (2020.01)
*G06T 11/20* (2006.01)
*G06F 16/26* (2019.01)
*G06T 11/60* (2006.01)

(52) U.S. Cl.
CPC ............ *G06F 40/106* (2020.01); *G06F 16/26* (2019.01); *G06T 11/206* (2013.01); *G06T 11/60* (2013.01); *G06T 2200/24* (2013.01)

(58) Field of Classification Search
CPC ...... G06F 40/106; G06F 16/26; G06F 3/0483; G06T 11/60; G06T 11/206; G06T 2200/24
See application file for complete search history.

(56) References Cited

U.S. PATENT DOCUMENTS

| 8,539,342 | B1* | 9/2013 | Lewis | G06F 40/137 |
| | | | | 715/243 |
| 2004/0225962 | A1* | 11/2004 | Ohashi | G06F 40/166 |
| | | | | 715/247 |
| 2008/0109740 | A1* | 5/2008 | Prinsen | G06F 16/9038 |
| | | | | 715/764 |
| 2009/0089660 | A1* | 4/2009 | Atkins | G06F 40/106 |
| | | | | 715/243 |
| 2009/0183080 | A1* | 7/2009 | Thakkar | G06F 16/4393 |
| | | | | 707/999.1 |

(Continued)

OTHER PUBLICATIONS

Bridget Winds Cogley, "Tips for creating mobile dashboards with new automatic layouts for Tableau" (May 20, 2019), Tableau, Resources, https://www.tableau.com/about/blog/2019/5/tips-creating-mobile-dashboards-new-automatic-layouts-tableau-107490, Accessed Dec. 22, 2020 (Year: 2019).*

*Primary Examiner* — Rami R Okasha
(74) *Attorney, Agent, or Firm* — Muncy, Geissler, Olds & Lowe, P.C.

(57) ABSTRACT

A method (and system) includes retrieving a dataset from a database, creating, on a first platform, a report including a visual representation of the dataset, automatically formatting the report to a second platform and displaying the report on a graphical user interface of the second platform. The first platform is a desktop computer or a laptop computer and the second platform is a tablet device or a handheld mobile device. The visualization of the dataset includes data containers in a first arrangement. The data containers are automatically formatted into a second arrangement to fit the graphical user interface of the second platform.

17 Claims, 30 Drawing Sheets

(56) References Cited

U.S. PATENT DOCUMENTS

| | | | |
|---|---|---|---|
| 2009/0210820 A1* | 8/2009 | Adachi | G06F 3/0481 715/788 |
| 2011/0074710 A1* | 3/2011 | Weeldreyer | G06F 3/0481 345/173 |
| 2013/0019175 A1* | 1/2013 | Kotler | G06F 3/0482 715/728 |
| 2013/0024757 A1* | 1/2013 | Doll | G06F 40/143 715/204 |
| 2013/0259377 A1* | 10/2013 | Goktekin | G06K 9/18 382/176 |
| 2013/0305145 A1* | 11/2013 | Jackson | G06F 40/103 715/246 |
| 2013/0332869 A1* | 12/2013 | Ferry | G06F 3/04842 715/765 |
| 2014/0071168 A1* | 3/2014 | Berglund | G06T 3/40 345/660 |
| 2014/0157165 A1* | 6/2014 | Hoyer | G06Q 10/10 715/769 |
| 2014/0208191 A1* | 7/2014 | Zaric | G06F 40/131 715/201 |
| 2015/0074516 A1* | 3/2015 | Ben-Aharon | G06F 40/106 715/234 |
| 2015/0153918 A1* | 6/2015 | Chen | G06Q 30/0201 715/771 |
| 2015/0154164 A1* | 6/2015 | Goldstein | G06F 40/106 715/229 |
| 2015/0248781 A1* | 9/2015 | Zimmer | G06T 11/60 345/619 |
| 2015/0310124 A1* | 10/2015 | Ben-Aharon | G06F 40/106 715/205 |
| 2015/0347432 A1* | 12/2015 | Tsai | G06F 16/958 715/202 |
| 2016/0048305 A1* | 2/2016 | Singal | G06F 3/0485 715/765 |
| 2016/0239163 A1* | 8/2016 | Singal | H04L 67/02 |
| 2016/0292134 A1* | 10/2016 | Elings | G06F 40/131 |
| 2016/0335740 A1* | 11/2016 | Graf | G06F 3/0481 |
| 2016/0364398 A1* | 12/2016 | Nelson | G06F 40/106 |
| 2017/0235706 A1* | 8/2017 | Esterly | G06F 3/048 715/243 |
| 2018/0004401 A1* | 1/2018 | Travis | G06F 3/04883 |
| 2018/0088783 A1* | 3/2018 | Anand | G06F 9/451 |
| 2018/0218523 A1* | 8/2018 | Dhanuka | G06T 11/60 |
| 2019/0005694 A1* | 1/2019 | Hamlin | G06T 11/001 |
| 2019/0304060 A1* | 10/2019 | Sial | G06T 11/60 |
| 2019/0317980 A1* | 10/2019 | Dhanuka | G06F 40/109 |
| 2019/0332861 A1* | 10/2019 | Biswas | G06F 3/0481 |
| 2020/0089397 A1* | 3/2020 | Chung | G06F 11/34 |
| 2020/0160572 A1* | 5/2020 | Shelman | G06F 40/106 |

* cited by examiner

SYSTEM AND METHOD FOR DOSSIER CREATION WITH RESPONSIVE VIEW HANDLING FOR FREE-FORM LAYOUT

BACKGROUND OF THE INVENTION

Field of the Invention

The present invention generally relates to a method and system for displaying data, and more particularly to a method and system for creating a business analytic report having a free-form, responsive layout to visualize data.

Description of the Related Art

Large databases are common in business today. Indeed, the amount of data available to business organizations today is rapidly increasing. Thus, a challenge for many organizations is to find a way to timely sort and present all relevant information while filtering unnecessary information.

In reporting systems, such as decision support systems, business intelligence systems and on-line analytical processing (OLAP) systems, data sorting and extraction are used to retrieve and present data in an efficient manner. Additionally, the reporting systems provide a means for a user to clearly and creatively present an interactive visualization of the relevant data.

Specifically, dossier building systems and programs or report system services documents (RSD) exists in which users can create a dashboard or canvas having one more datasets displayed in different containers. The data sets in each container display an interactive visualization of user selected data (e.g., a table, graph, pie chart, etc.). Particularly, a RSD contains datasets from one or more reports. The data is positioned and formed into a single visual representation of the data that can be presented to a user. The datasets can be displayed in a document or a RSD dashboard. When a user creates a document, report, dossier, visualization, or dashboard, the user specifies the data that appears. Furthermore, the user can control the layout, formatting and grouping of the data.

In current report or dashboard building systems, the dossiers or dashboards can be difficult to build and require precise positioning of the elements of the dashboard/canvas (i.e., the containers). That is, in current report or dashboard building systems the containers are all connected such that a change to one container will initiate a change in the other containers on the dashboard. For example, if a user changes a size or location of one of the containers, the size or location of the other containers will also change. Thus, current report or dashboard building systems lack sufficient flexibility in report creation.

Moreover, since the introduction and evolution of dossiers (dashboards), users have been looking for functionality within the dossier authoring experience similar to highly formatted RSDs. Specifically, there has been a desire to achieve flexibility of visualization placement of RSDs while retaining the "smart" function of current dossiers (i.e., snapping/docking data containers in a canvas). Dossier creation and formatting is currently cumbersome and frustrating. Due to the nature of Layout XML, users can group visualizations within a same level without realizing it, which can prevent the user from achieving the desired formatting, specifically when resizing visualizations.

Furthermore, in current report or dashboard building systems, when a user creates a report or dashboard on one platform or device, the report or dashboard is not easily formatted to other platforms or devices. For example, if a user creates a report or dashboard on a laptop computer and formats the report or dashboard to the dimensions of the display of the laptop computer, the report or dashboard will not be properly displayable on another device with different dimensions (e.g., a mobile telephone, tablet, etc.).

SUMMARY OF THE INVENTION

In view of the foregoing and other exemplary problems, drawbacks, and disadvantages of the conventional methods and structures, an exemplary feature of the present invention is to provide a method and system for generating reports, which maintains the responsiveness of the canvass layout while increasing the flexibility of design of the layout. Specifically, the present method and system will have the ability to position items in a dossier exactly how the user desires while retaining a responsive view of the dossier across different platforms.

In a first, exemplary, non-limiting aspect of the present invention, a method includes retrieving a dataset from a database, creating, on a first platform, a report including a visual representation of the dataset, automatically formatting the report to a second platform and displaying the report on a graphical user interface of the second platform.

In a second, exemplary, non-limiting aspect of the present invention, a non-transitory computer processor-readable storage medium storing instructions is configured for execution by a computer for retrieving a dataset from a database, creating, on a first platform, a report including a visual representation of the dataset, automatically formatting the report to a second platform and displaying the report on a graphical user interface of the second platform.

In a third, exemplary, non-limiting aspect of the present invention, a system includes a database storing a dataset, a first platform comprising a processor configured to create a report including a visual representation of the dataset, and a second platform comprising a graphical user interface configured to display the report, wherein the report is automatically formatted to the second platform when displayed on the second platform.

In accordance with the above, exemplary aspects of the present invention, a method and system are provided in which the dossier creation can mimic the flexible formatting capabilities of RSDs. That is, the canvas will be completely open and visualizations can be organized in anyway the user desires. Furthermore, a dossier created on a first platform will be completely responsive such that the dossier, when viewed on a second platform, will be automatically formatted to the dimensions of the second platform for proper display. Thus, the current method and system will provide dossiers that provide both flexibility in authorizing and responsiveness in displaying.

BRIEF DESCRIPTION OF THE DRAWINGS

The foregoing and other exemplary purposes, aspects and advantages will be better understood from the following detailed description of an exemplary embodiment of the invention with reference to the drawings, in which:

FIG. 5 illustrates an exemplary report generated by the system and method of the present invention;

DETAILED DESCRIPTION OF EXEMPLARY

Embodiments of the Invention

Figure 1:
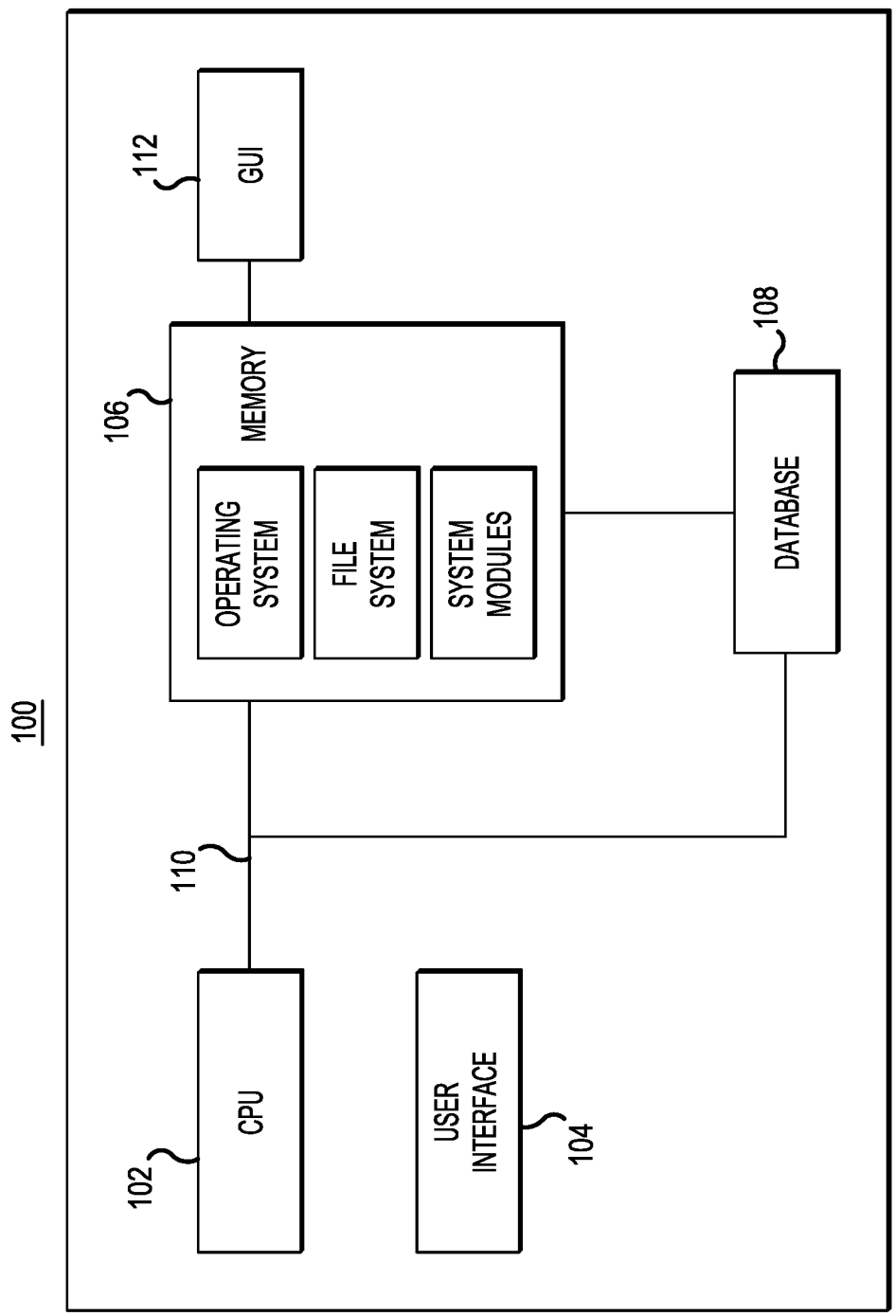
FIG. 1 illustrates a system 100 according to certain exemplary embodiments of the present invention.

Referring now to the drawings, and more particularly to FIGS. 1-20, there are shown exemplary embodiments of the method and structures according to the present invention.

FIG. 1 is a block diagram illustrating a system 100 according certain exemplary aspects of the invention. Specifically, the system 100 is configured to create reports/documents/dossiers including a visualization of one or more datasets. As is illustrated in FIG. 1, the system 100 includes a CPU 102 having a user interface 104 (e.g., mouse, keyboard, touch screen, etc.). The CPU 102 is connected to a memory 106, storing an operating system, file system and computer system modules configured to perform the method of the present invention (e.g., process data and generate reports), and a database 108, storing one or more datasets, by a system bus 110. The system 100 includes a graphical user interface (GUI) 112 configured to receive and display a generated report.

Figure 2:
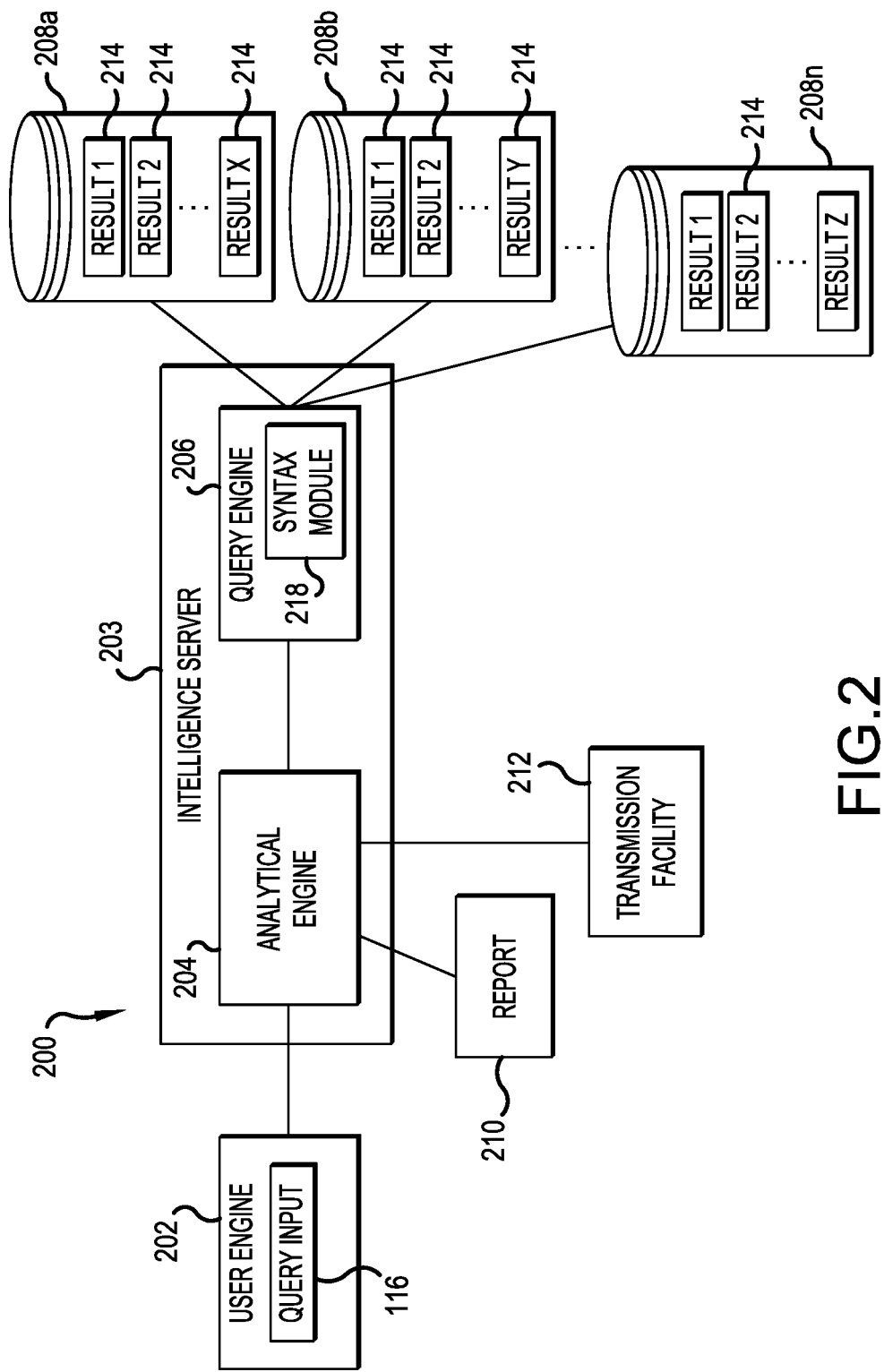
FIG. 2 illustrates a system 200 according to certain exemplary embodiments of the present invention.

FIG. 2 further defines elements of the system in accordance with certain exemplary embodiments of the present invention. Specifically, FIG. 2 is a block diagram illustrating a system 200 by which a variety of data resources may be accessed for business analytic, report generation and other intelligence purposes according to an embodiment of the invention. According to certain exemplary embodiments of the invention, the system 200 may comprise an online analytical processing (OLAP) decision support system (DSS). In particular, FIG. 2 may comprise a portion of the Microstrategy platform, which provides a preferred system in which the present invention may be implemented.

In general, through using the system 200 of the invention, analysts, managers and other users may query or interrogate a plurality of databases or database arrays to extra demographic, sales and/or financial data and information and other patterns from records stored in such databases or database arrays to identify strategic trends. The strategic trends may not be discernable without processing the queries and treating the results of the data extraction according to the techniques performed by the systems and methods of the invention. This is in part because the size and complexity of some data portfolios stored in such databases or database arrays may mask those trends.

In addition, the system 200 may enable the creation of reports or services that are processed according to a schedule. Users may then subscribe to the service, provide personalization criteria and have the information automatically delivered to the user.

As illustrated in FIG. 2, a business, government, user or other organization may access the resources of the system 200 using a user engine 202. The user engine 202 may include a query input module 216 to accept a plurality of searches, queries or other requests, via a query box or on a graphical user interface (GUI) or another similar interface. The user engine 202 may communicate with an analytical engine 204. The analytical engine 204 may include a set of extensible modules to run a plurality of statistical analyses, to apply filtering criteria, to perform a neural net technique or another technique to condition and treat data extracted from data resources hosted in the system 200, according to a query received from the user engine 202.

The analytical engine 204 may communicate with a query engine 206, which in turn interfaces to one or more data storage devices 208a, 208b . . . 208n (where n is an arbitrary number). The data storage devices 208a, 208b . . . 208n may include or interface to a relational database or another structured database stored on a hard disk, an optical disk, a solid state device or another similar storage media. When implemented as databases, the data storage devices 208a, 208b . . . 208n may include or interface to, for example, an Oracle™ relational database such as sold commercially by Oracle Corporation, an IBM Informix™ database, a Database 2 (DB2) database, a Teradata database, or another data storage device or query format, platform or resource such as an OLAP format, a Standard Query Language (SQL) format, a storage area network (SAN), or a Microsoft Access™ database. It should be understood that while data storage devices 208a, 208b . . . 208n are illustrated as a plurality of data storage devices, in some embodiments the data storage devices may be contained within a single database or another single resource.

Any of the user engine 102, the analytical engine 104 and the query engine 106 or other resources of the system 100 may include or interface to or be supported by computing resources, such as one or more associated servers. When a server is employed for support, the server may include, for instance, a workstation running a macOS operating system, a Windows™ 10 operating system, a Unix operating system, or a Linux operating system, or a server running an Oracle Solaris™ operating system, a macOS, Red Hat, Ubuntu or other Linux-based server operating systems. According to one embodiment of the present invention, the analytical engine 304 and the query engine 306 may comprise elements of an intelligence server 303.

The data storage devices 208a, 208b . . . 208n may be supported by a server or another resource and may, in some embodiments, include redundancy, such as a redundant array of independent disks (RAID), for data protection. The storage capacity of any one or more of the data storage devices 208a, 208b . . . 208n may be of various sizes, from relatively small datasets to very large database (VLDB)-scale datasets, such as warehouses holding terabytes of data or more. The fields and types of data stored within the data storage devices 208a, 208b . . . 208n may also be diverse, and may include, for instance, financial, personal, news, marketing, technical, addressing, governmental, military, medical or other categories of data or information.

The query engine 206 may mediate one or more queries or information requests from those received from the user at the user engine 202 to parse, filter, format and otherwise process such queries to be submitted against the data contained in the data storage devices 208a, 208b . . . 208n. Thus, a user at the user engine 202 may submit a query requesting information in SQL format, or have the query translated to SQL format. The submitted query is then transmitted via the analytical engine 204 to the query engine 206. The query engine 206 may determine, for instance, whether the transmitted query may be processed by one or more resources of the data storage devices 208a, 208b ... 208n in its original format. If so, the query engine 206 may directly transmit the query to one or more of the resources of the data storage devices 208a, 208b ... 208n for processing.

If the transmitted query cannot be processed in its original format, the query engine 206 may perform a translation of the query from an original syntax to a syntax compatible with one or more of the data storage devices 208a, 208b ... 208n by invoking a syntax module 218 to conform the syntax of the query to standard SQL, DB2, IBM Informix™, Teradata formats or to other data structures, syntax or logic.

The query engine 206 may likewise parse the transmitted query to determine whether it includes any invalid formatting or to trap other errors included in the transmitted query, such as a request for sales data for a future year or other similar types of errors. Upon detecting an invalid or an unsupported query, the query engine 206 may pass an error message back to the user engine 202 to await further user input.

When a valid query such as a search request is received and conformed to a proper format, the query engine 206 may pass the query to one or more of the data storage devices 208a, 208n ... 208n for processing. In some embodiments, the query may be processed for one or more hits against one or more databases in the data storage devices 208a, 208b ... 208n. For example, a manager of a restaurant chain, a retail vendor or another similar user may submit a query to view gross sales made by the restaurant chain or retail vendor in the State of New York for the year 1999. The data storage devices 208a, 208b ... 208n may be searched for one or more fields corresponding to the query to generate a set of results 214.

Although illustrated in connection with each data storage device 208 in FIG. 1, the results 214 may be generated from querying any one or more of the databases of the data storage devices 208a, 208b ... 208n, depending on which of the data resources produce hits from processing the search query. In some embodiments of the system 200 of the invention, the results 214 may be maintained on one or more of the data storage devices 208a, 208b ... 208n to permit one or more refinements, iterated queries, joinders or other operations to be performed on the data included in the results 214 before passing the information included in the results 214 back to the analytical engine 204 and other elements of the system 200.

When any such refinements or other operations are concluded, the results 214 may be transmitted to the analytical engine 204 via the query engine 206. The analytical engine 204 may then perform statistical, logical or other operations on the results 214 for presentation to the user. For instance, in the State of New York reached $1 M in sales at the earliest time in the year 2019. Or, the user may submit a query asking for an average, a mean and a standard deviation of an account balance on a portfolio of credit or other accounts.

The analytical engine 204 may process such queries to generate a quantitative report 210, which may include a table or other output indicating the results 214 extracted from the data storage devices 208a, 208b ... 208n. The report 210 may be presented to the user via the user engine 202, and, in some embodiments, may be temporarily or permanently stored on the user engine 202, a client machine or elsewhere, or printed or otherwise output. In some embodiments of the system 200 of the invention, the report 210 or other output may be transmitted to a transmission facility 212, for transmission to a set of personnel via an email, an instant message, a text-to-voice message, a video or via another channel or medium. The transmission facility 212 may include or interface to, for example, a personalized broadcast platform or service. Similarly, in some embodiments of the invention, more than one user engine 202 or other client resource may permit multiple users to view the report 210, such as, for instance, via a corporate intranet or over the Internet using a Web browser. Various authorization and access protocols may be employed for security purposes to vary the access permitted users to such report 210 in such embodiments.

Additionally, an administrative level user may create a report as part of a service. Subscribers/users may then receive access to reports through various types of data delivery devices including telephones, email, wireless communication devices, mobile phones, tablets, and many others. In addition, subscribers may specify trigger conditions so that the subscriber receives a report only when that condition has been satisfied. The platform of FIG. 2 may have many other uses, as described in detail with respect to the MicroStrategy platform, the details of which will be appreciated by one of ordinary skill in the reporting and decision support system art.

Figure 3:
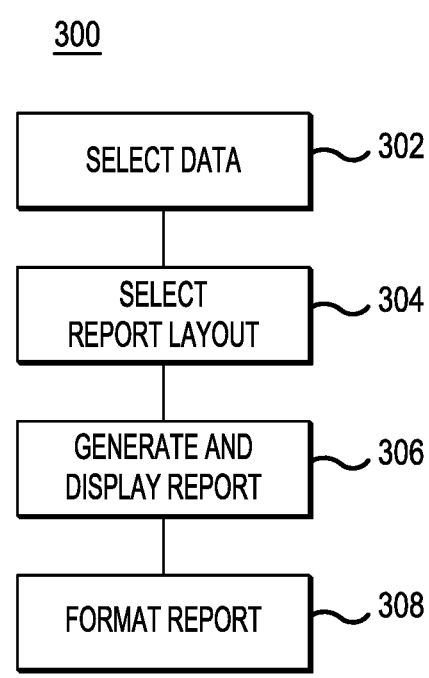
FIG. 3 illustrates a method 300 according to certain exemplary embodiments of the present invention.

FIG. 3 illustrates a basic flow chart of a method 300 for generating a report according to certain exemplary embodiments of the invention. At step 302, the system receives a request from a user for selecting one or more specific datasets from the database/data storage devices. At step 304, the user selects a report layout 304. At step 306, the system generates and displays the report based on the selected layout and selected dataset(s). At step 308, the user formats the layout and specific containers included in the layout.

Figure 4:
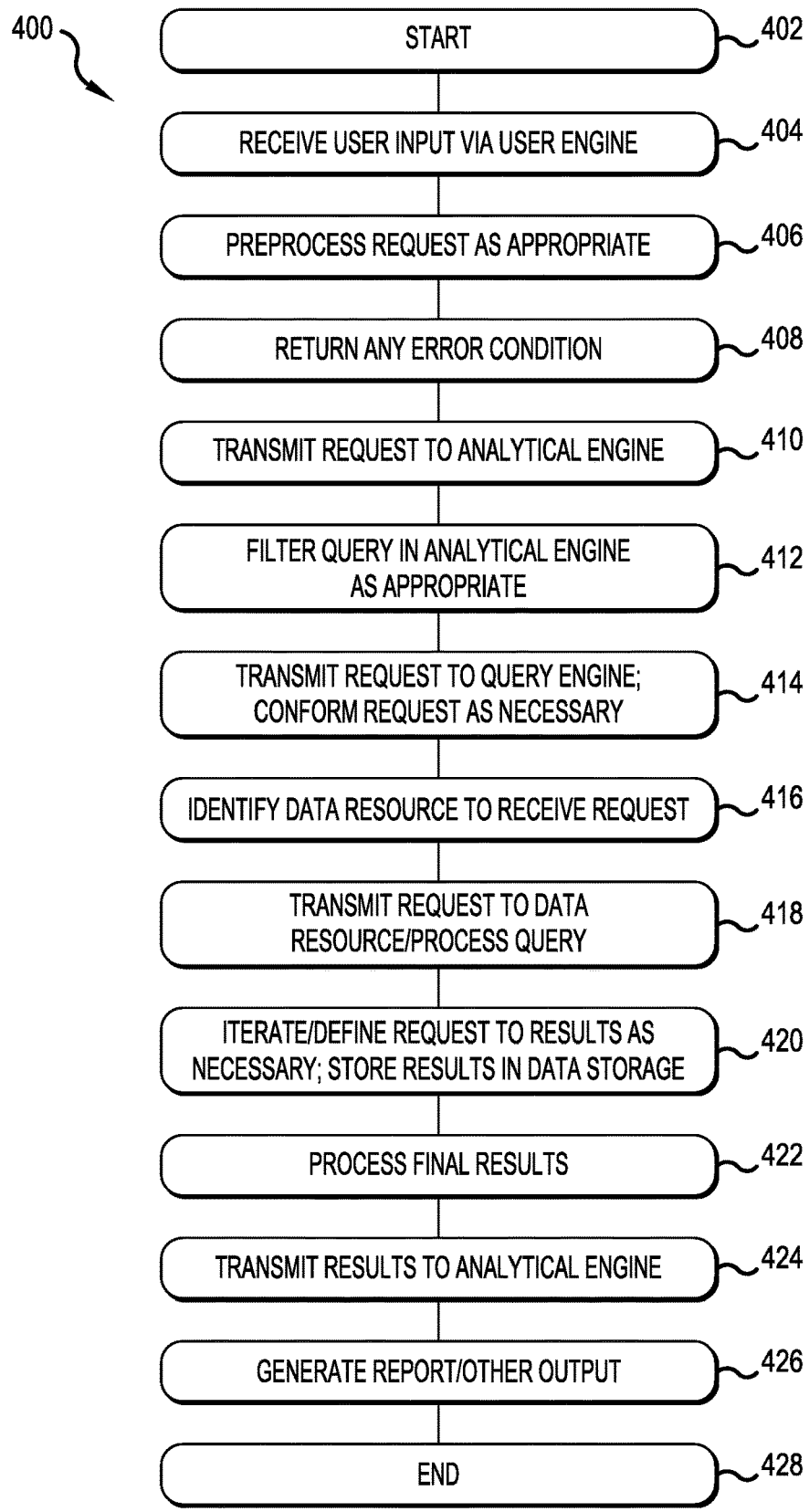
FIG. 4 illustrates a method 400 according to certain exemplary embodiments of the present invention.

The specific steps performed in a method 400 for generating a report according to certain exemplary embodiments of the present invention are illustrated in the flowchart of FIG. 4. In step 402, the method 400 begins. In step 404, the user may supply input, such as a query or a request for information, via the user engine 202. In step 406, the user input query may be preliminarily processed, for instance, to determine whether it includes valid fields and for other formatting and error-flagging issues. In step 408, any error conditions may be trapped and an error message presented to the user, for correction of the error conditions. In step 410, if a query is in a valid format, the query may then be transmitted to the analytical engine 204.

In step 412, the analytical engine 204 may further process the input query as appropriate to ensure the intended results 214 may be generated to apply the desired analytics. In step 414, the query engine 206 may further filter, format and otherwise process the input query to ensure that the query is in a syntax compatible with the syntax of the data storage devices 208a, 208b ... 208n. In step 416, one or more appropriate databases or other resources within the data storage devices 208a, 208b ... 208n may be identified to be accessed for the given query.

In step 418, the query may be transmitted to the data storage devices 208a, 208b ... 208n and the query may be processed for hits or other results 214 against the content of the data storage devices 208a, 208b ... 208n. In step 420, the results 214 of the query may be refined, and intermediate or other corresponding results 214 may be stored in the data storage devices 208a, 208b ... 208n. In step 422, the final results 214 of the processing of the query against the data storage devices 208a, 208b ... 208n may be transmitted to the analytical engine 204 via the query engine 206. In step 424, a plurality of analytical measures, filters, thresholds, statistical or other treatments may be run on the results 214. In step 426, a report 210 may be generated. The report 210, or other output of the analytic or other processing steps, may be presented to the user via the user engine 202. In step 428, the method 400 ends.

Figure 5:
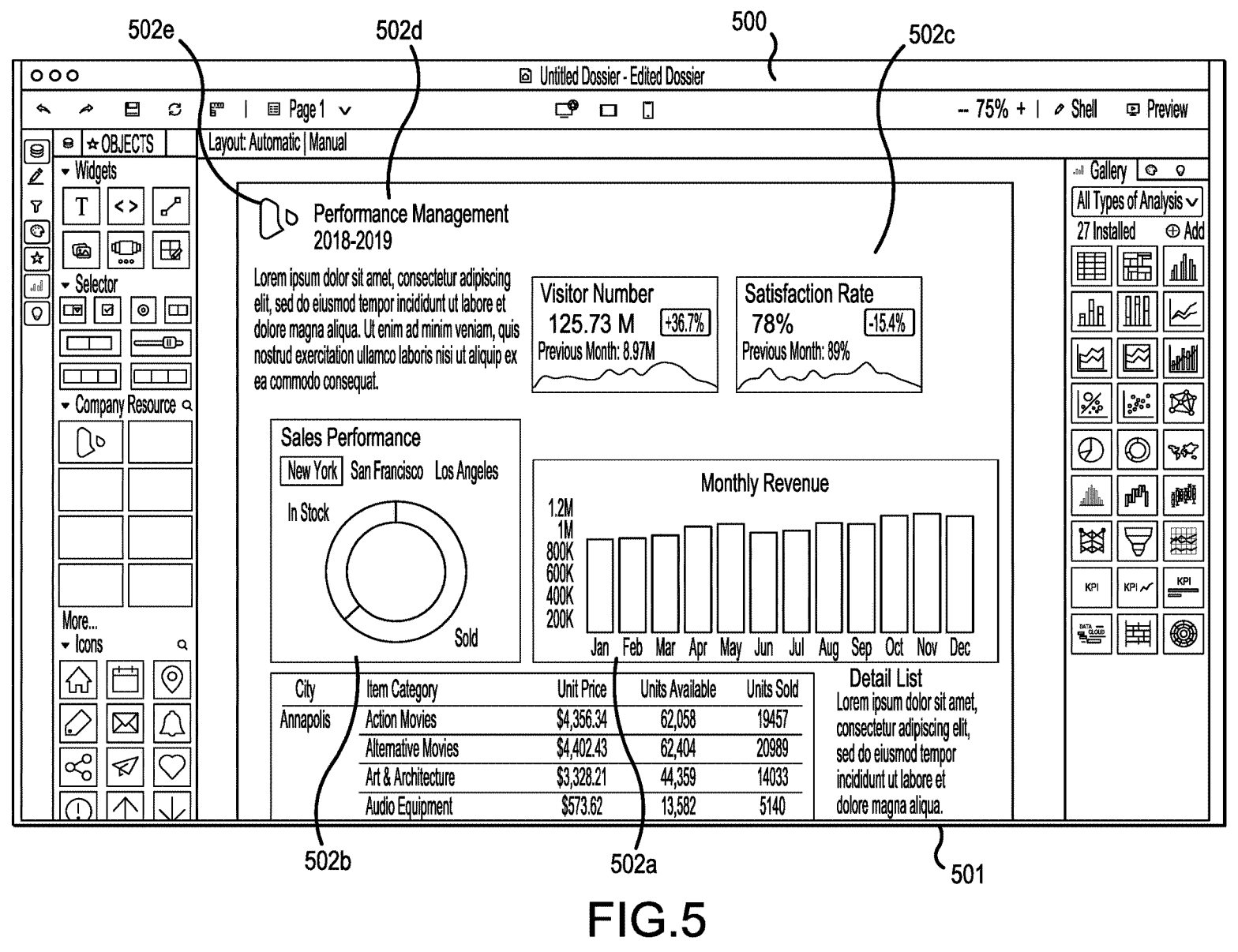

FIG. 5 illustrates a report 500 generated by the system and method according to certain exemplary embodiments of the present invention. As illustrated in FIG. 5, the report 500 includes one or more containers 502a, 502b, 502c, 502d . . . 502n (where n is an integer greater than or equal to 1). The containers or frames each include a visualization. Some of the containers include visualizations of data while other containers include text or images. For example, the report includes a container 502a including a graph, a container 502b including a pie chart, a container 502c including a key performance indictor (KPI) visualization (KPI widget), a container 502d including text and a container 502e including a logo or image. In accordance with the present method and system, the containers may be placed and arranged in the dossier 500 automatically by the system or manually by the user.

Figure 6:
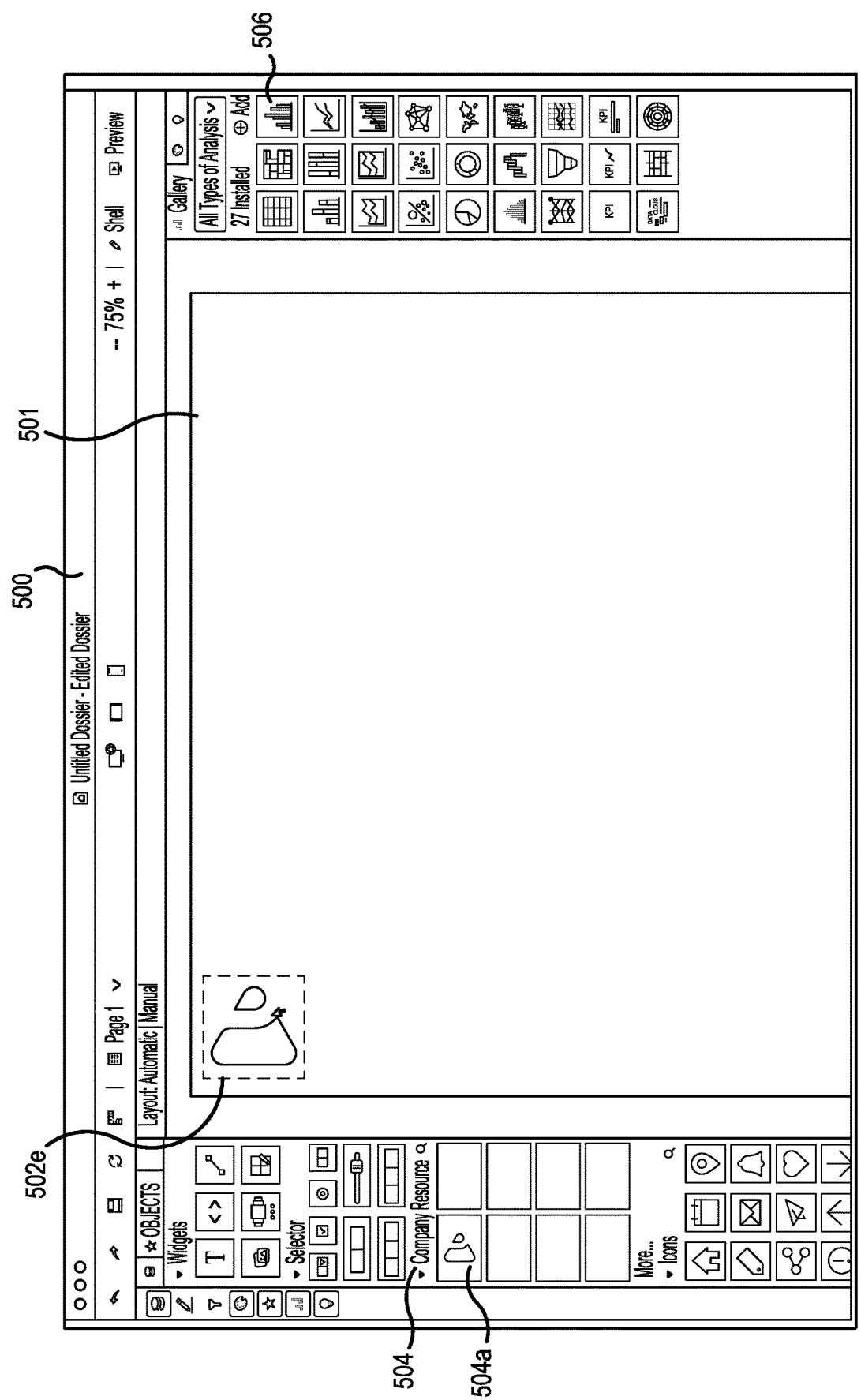
FIGS. 6-9C illustrate a dossier being created according to certain exemplary aspects of the present invention.

In the manual mode, the user can add an object (i.e., container) simply by a drag-drop-function. For example, as is illustrated in FIG. 6, the user can drag an image 504a from an image gallery 504 into the data container 502e in the dossier 500. Additionally, the dossier 500 includes a visualization gallery 506. The user can drag visualizations including, for example, a KPI, pie chart, graph, etc. from the visualization gallery into the canvas 501 of the dossier 500. When the user adds one of the above-described objects to the canvas 501 by the drag-and-drop function, each object has a standard size. The user can adjust the size of the object and position the object anywhere in the canvas 501 simply my dragging the object.

Figure 6A:
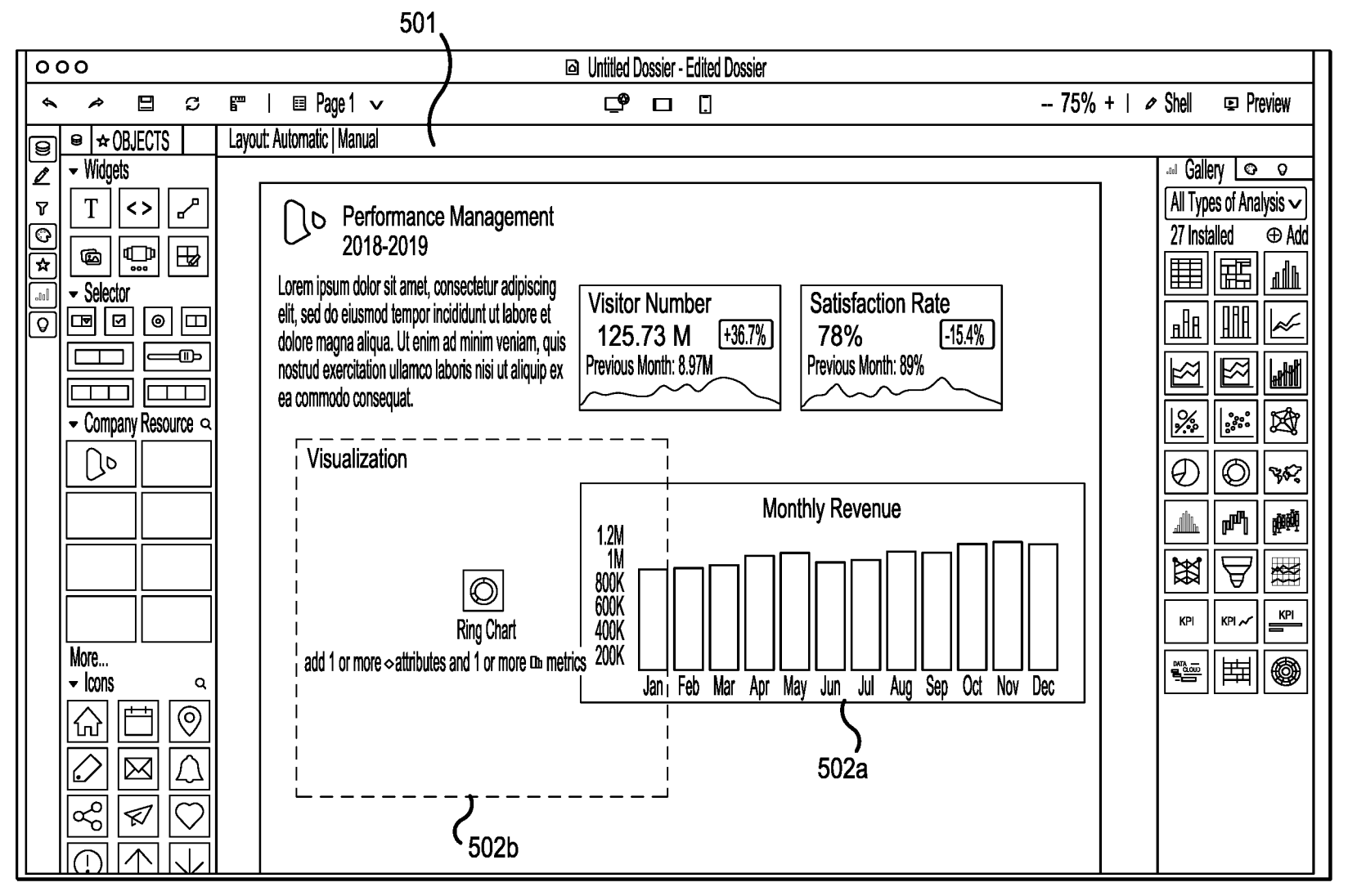
Figure 6B:
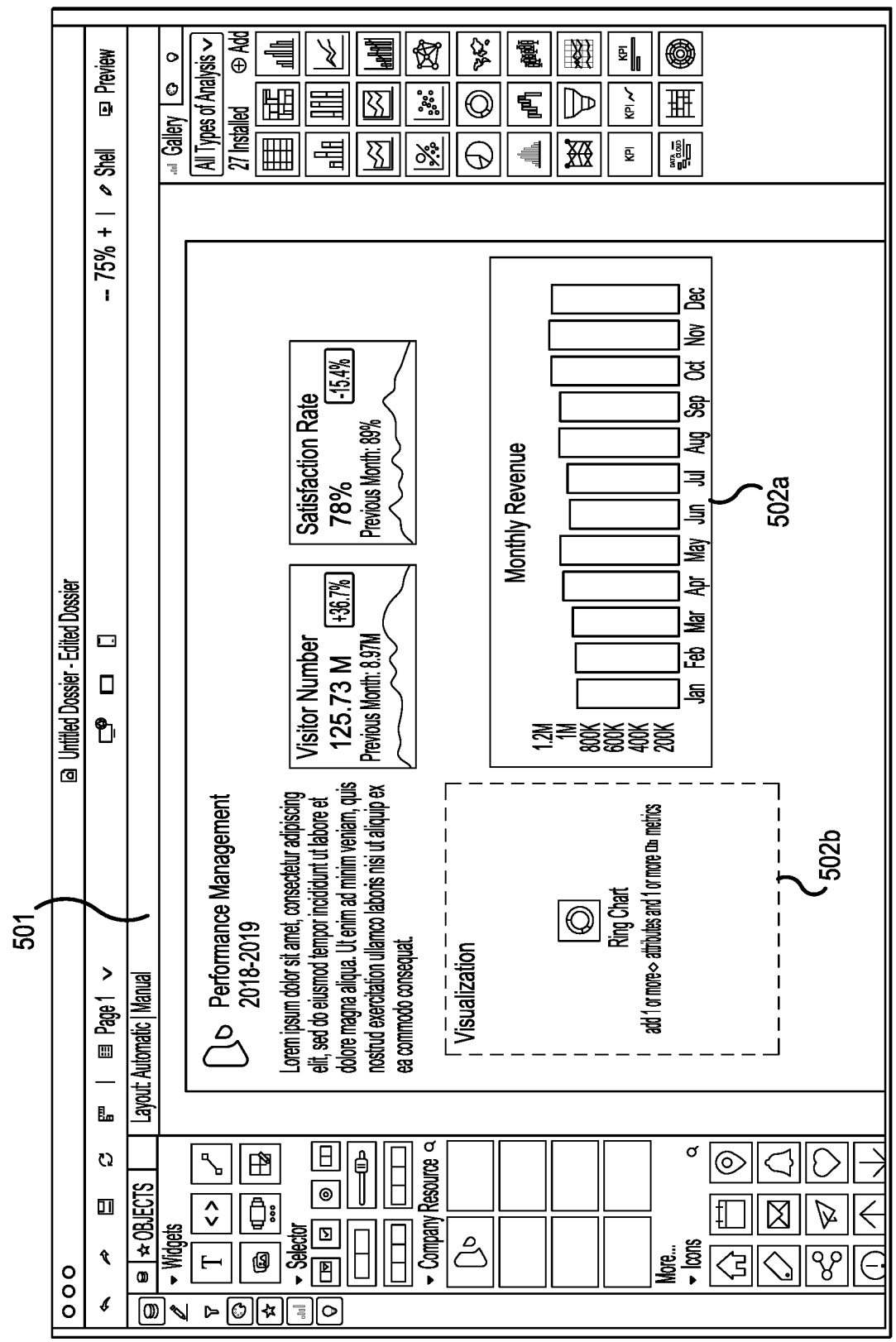

When positioning the objects in the canvas 501, the system will automatically correct placement issues. For example, if the user adds an object to a position that overlaps or partially overlaps an existing object, the system will automatically resize the new object to fit within an open space in the canvas. That is, as is illustrated in FIGS. 6A and 6B, the user has placed a new object/visualization 502b which overlaps with the existing container 502a including a graph. As is illustrated in FIG. 6B, the system automatically resizes the new object/visualization 502b to fit an open space in the canvas and not overlap with the existing container 502a including the graph.

Figure 6C:
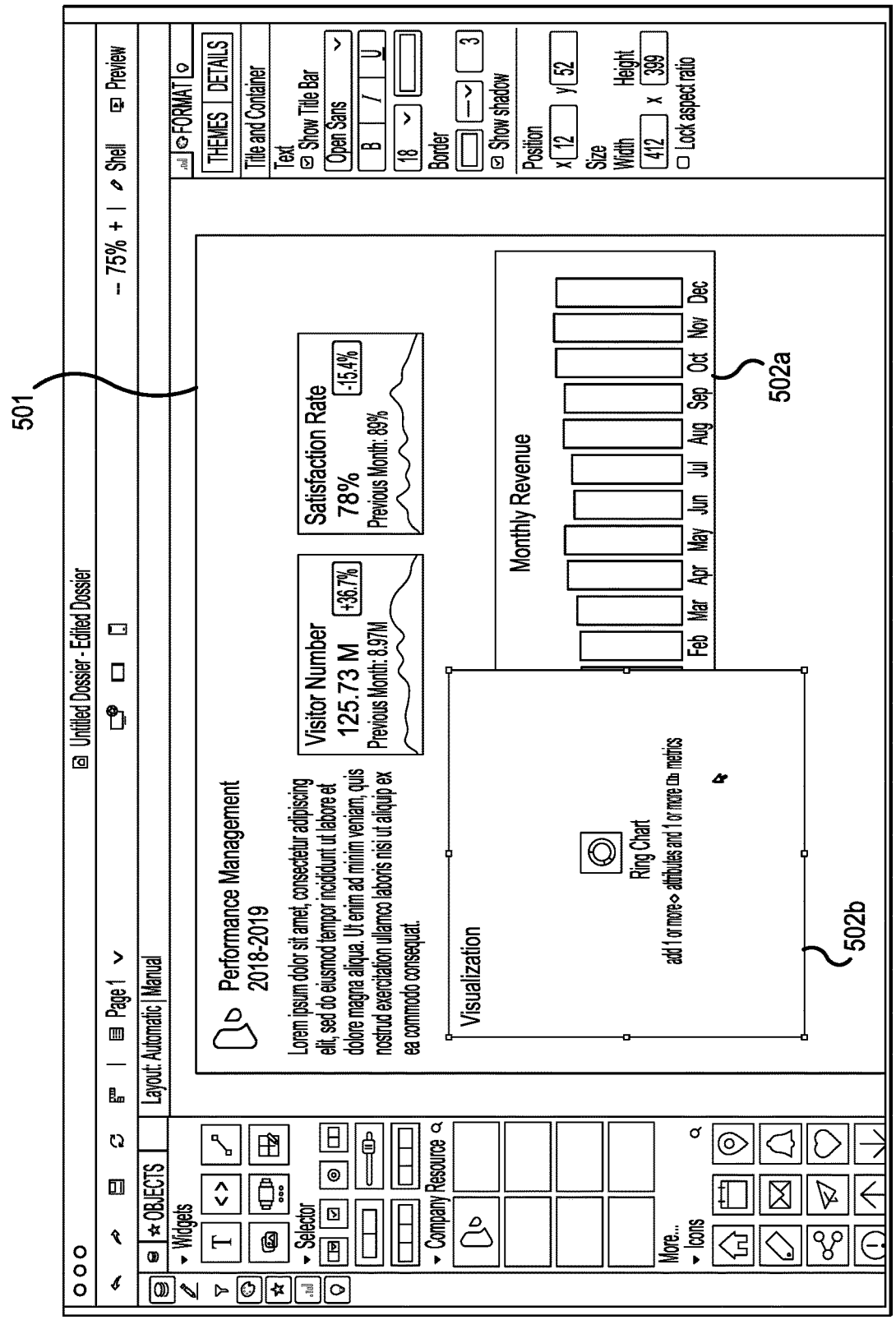

If, however, the new object/visualization 502b is added to an area of the canvas 501 having limited space and overlaps an existing container (e.g., see FIG. 6C), then the object will remain in the position where the user dropped the new object/visualization 502b. The new object/visualization 502b will then overlap the existing container 502a including the graph. In this case, the object that was added most recently (the new object/visualization 502b in FIG. 6C) will remain, by default, the top most layer. The user can elect to leave the objects in the data containers 502a/502b overlapping or the user can manually resize and/or replace either or all of the existing objects.

Figure 6D:
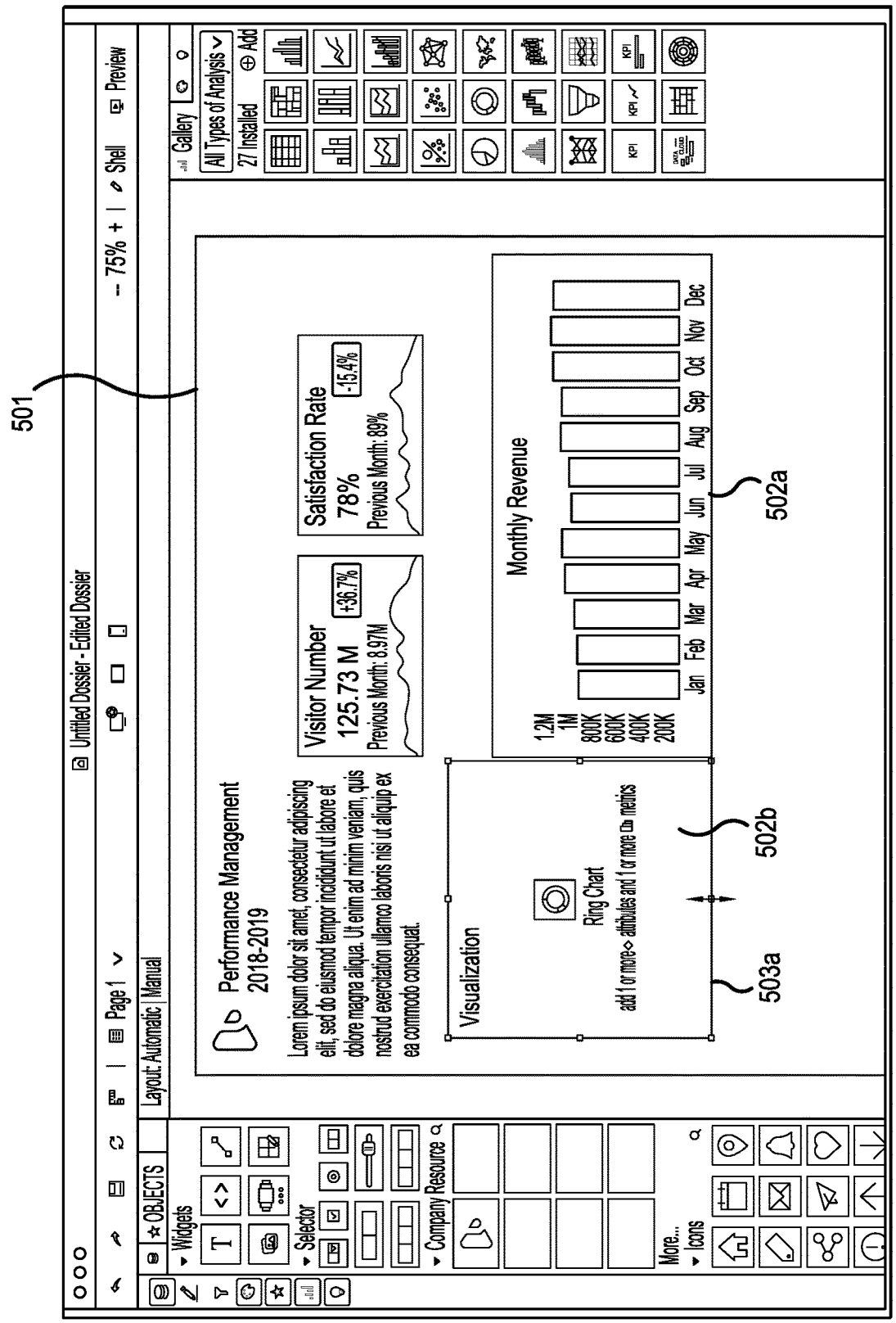

As is illustrated in FIG. 6D, when a user resizes an object/visualization, then the object/visualization will snap-fit according to alignment guidelines. The alignment guidelines include align left, align center, align right, align top, align middle and align bottom, which appear as lines on the dossier (e.g., 503a in FIG. 6D and 503b in FIG. 6E). Moreover, as is illustrated in FIG. 8C, the user can select any of the above alignments from a drop down menu 514. When the user selects the specific alignment (e.g., align left, align center, align right, align top, align middle and align bottom) the corresponding alignment guidelines will be displayed.

Figure 6E:
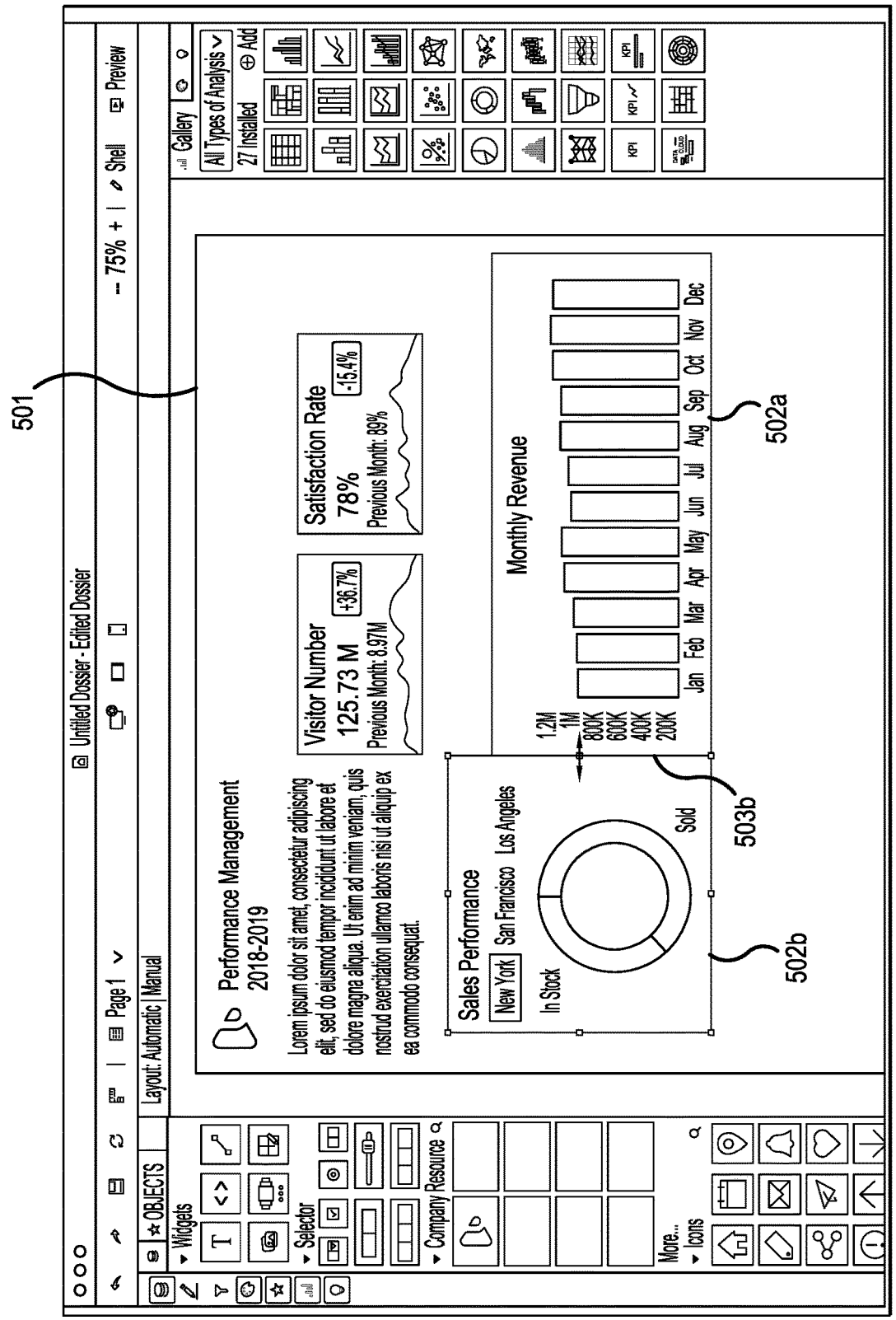
Figure 7A:
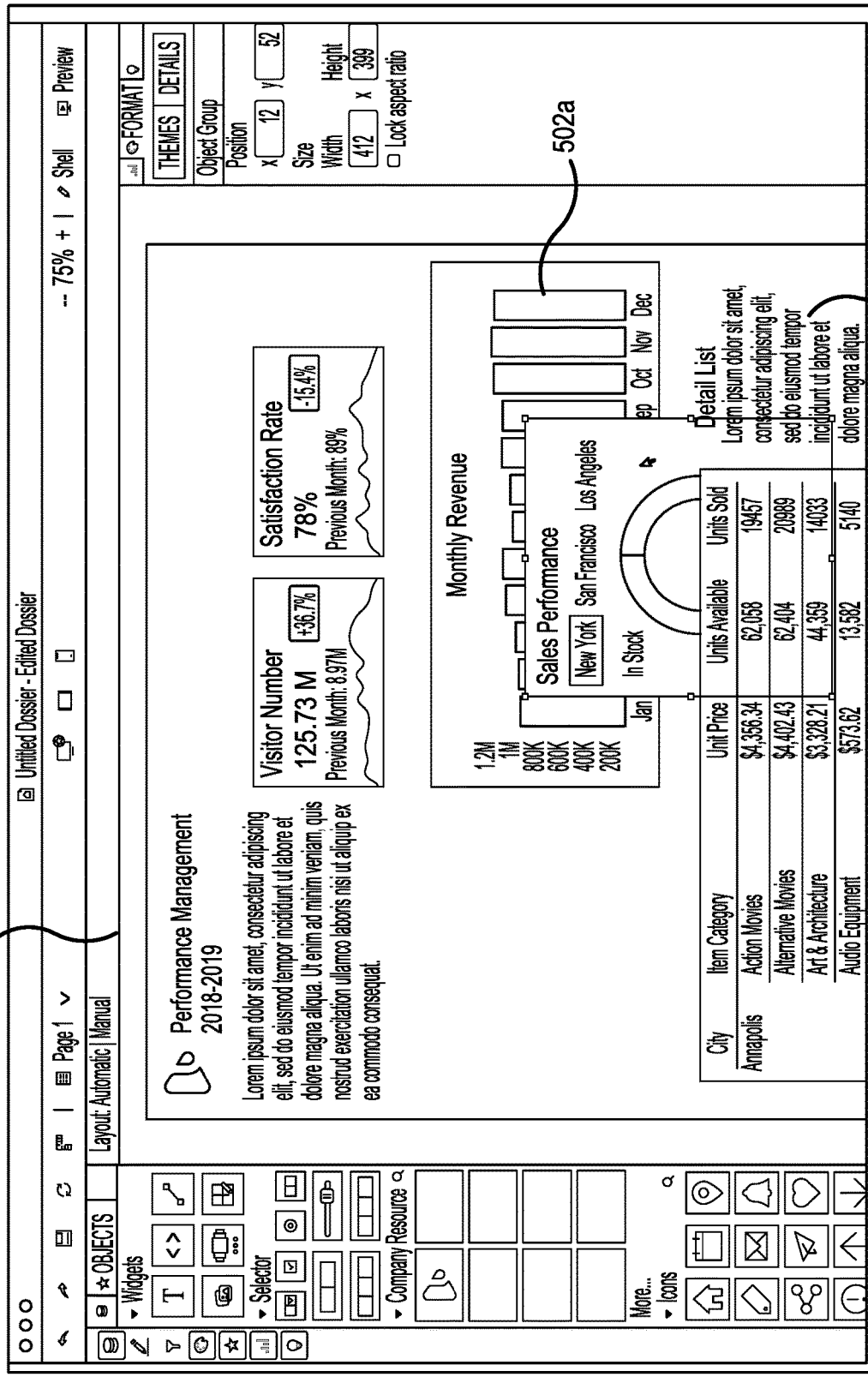
Figure 7B:
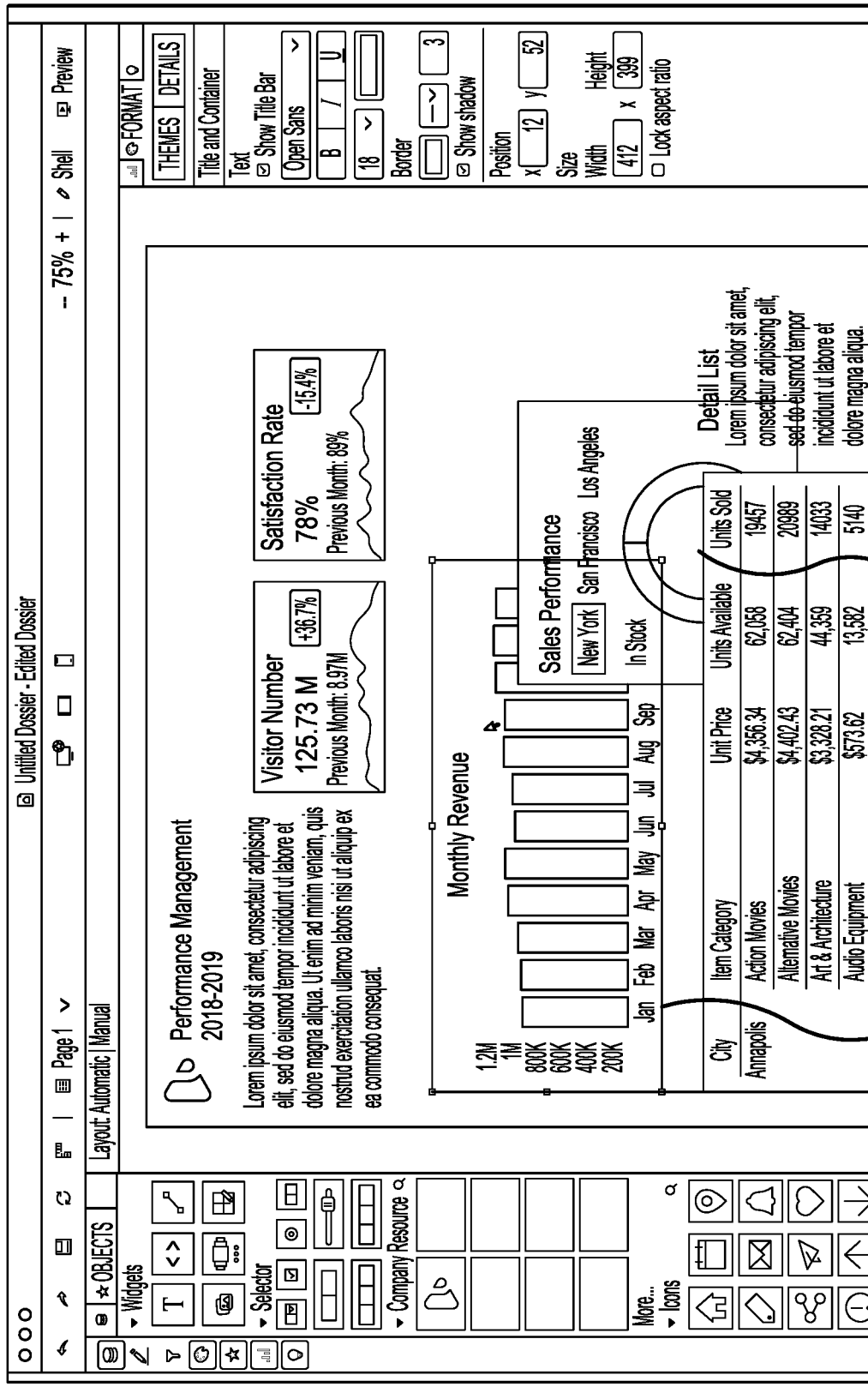

Furthermore, as the user is resizing the object/visualization, once the object/visualization collides with or contacts another existing object/visualization, then the system will stop the object/visualization from further resizing. For example, as is illustrated in FIG. 6E, as the user increases the size of the container 502b including the pie chart, once the container 502b including the pie chart contacts the container 502a including the graph the system will stop the user from further increasing the size of the container 502b including the pie chart. That is, the user can continue to resize the container 502b but when the container 502b impacts or reaches another container, for example container 502a, there is a stop-moment and the system displays a guideline (e.g., 503b in FIG. 6E) to the let the user know that that container has reached an edge of another container. The user can then still continue to resize the container 502b, but it would overlap with the other container and the red line would be removed. Once the user has initially placed objects/visualizations in the canvas, the user is able to freely move the placed objects/visualizations within the canvas by simply dragging the object/visualizations. For example, as is illustrated in FIGS. 7A and 7B, if the user wishes to swap the position of the container 502a including a graph, a container 502b including a pie chart, as initially positioned in FIG. 5, the user can simply first drag one of the objects/visualizations (e.g., in FIG. 7A the container 502b including the pie chart) from its initial position to a new position (i.e., in FIG. 7A the initial position of the container 502a including the graph) and then drag the other object/visualization (e.g., in FIG. 7B the container 502a including the graph) from its initial position to a new position (i.e., in FIG. 7B the initial position of the container 502b including the pie chart). The system allows the user to freely move any of the object(s)/visualization(s) within the canvas 501 by simply dragging the object(s)/visualization(s).

Figure 8A:
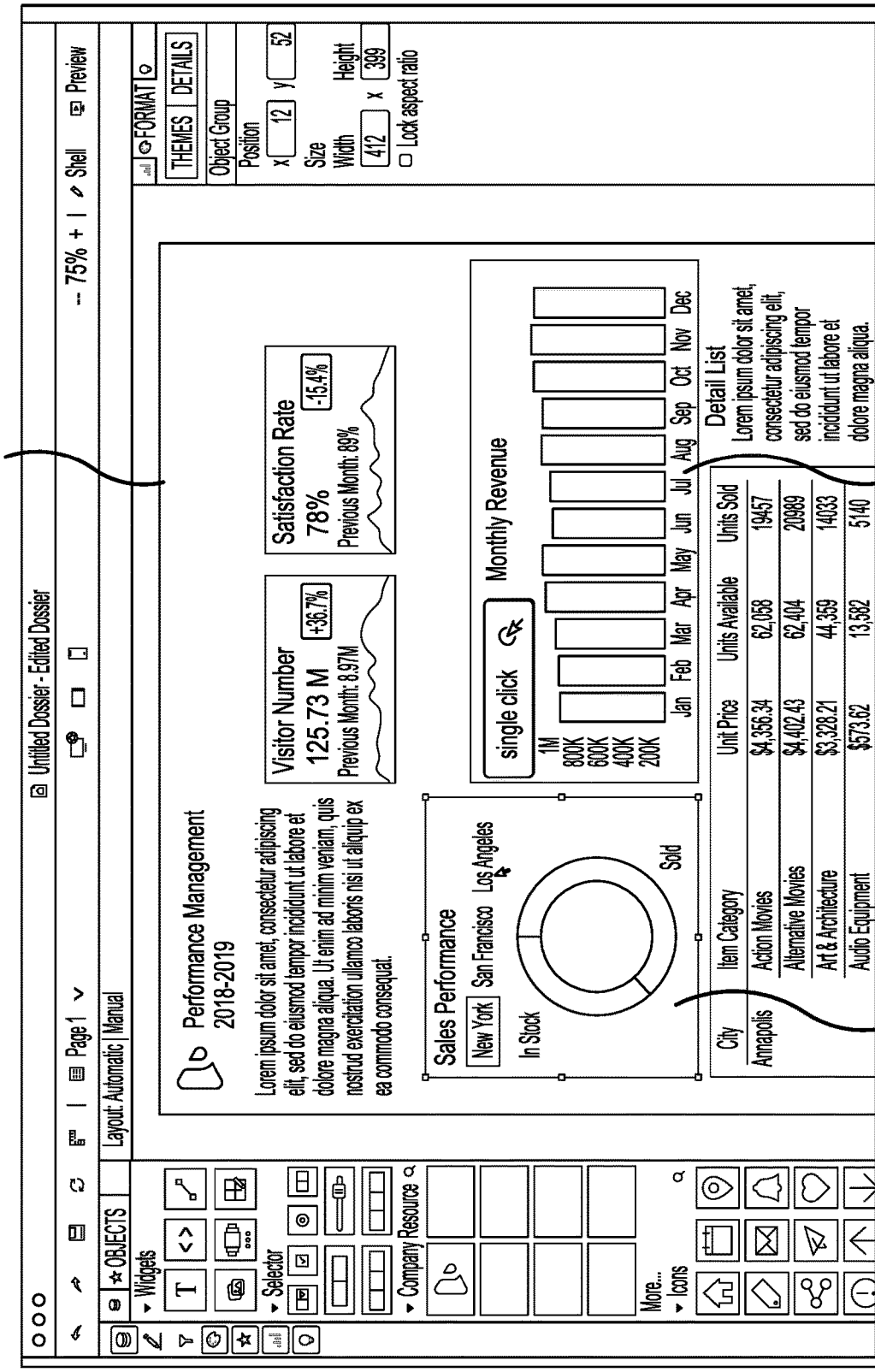
Figure 8B:
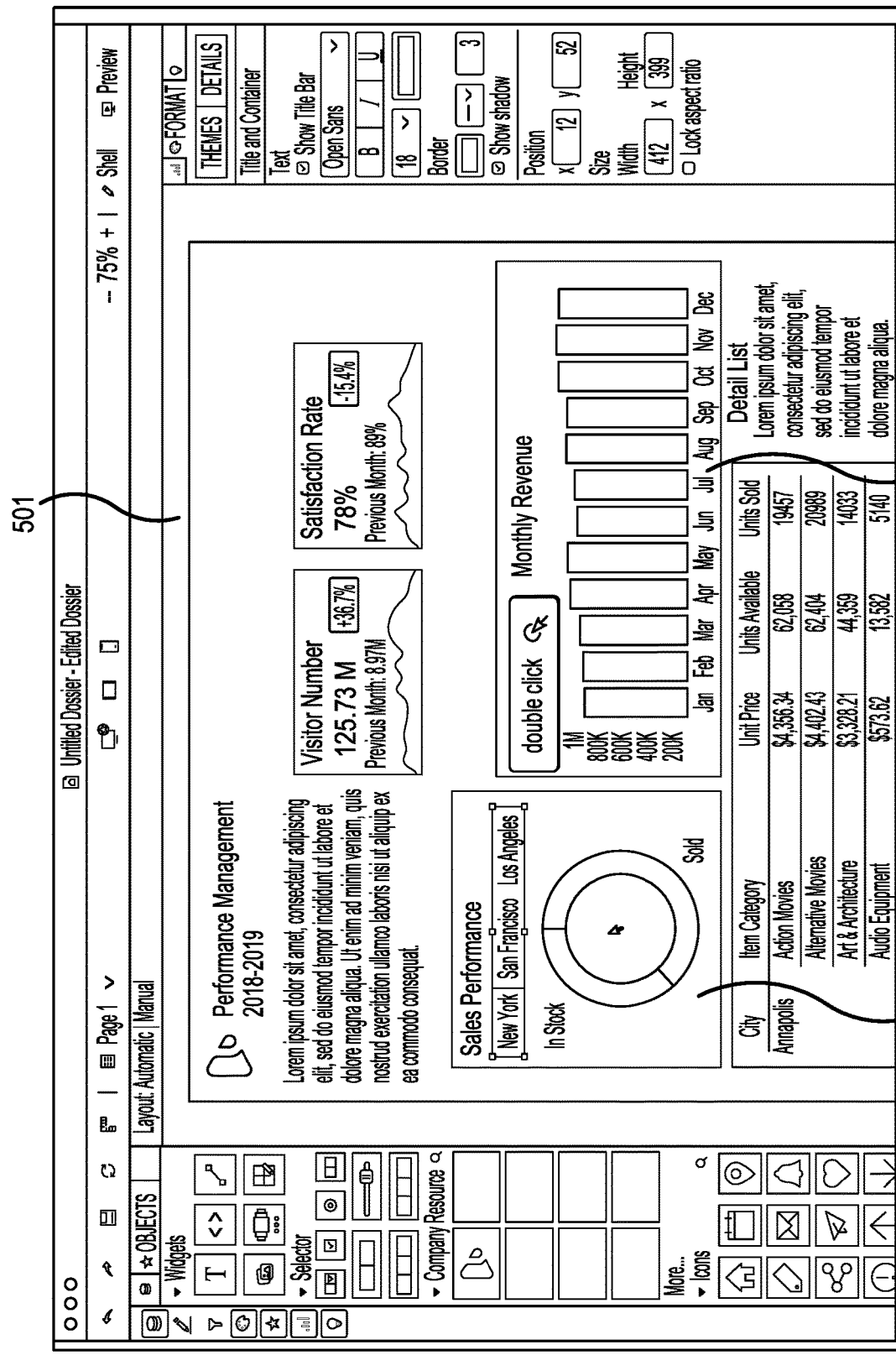
Figure 8C:
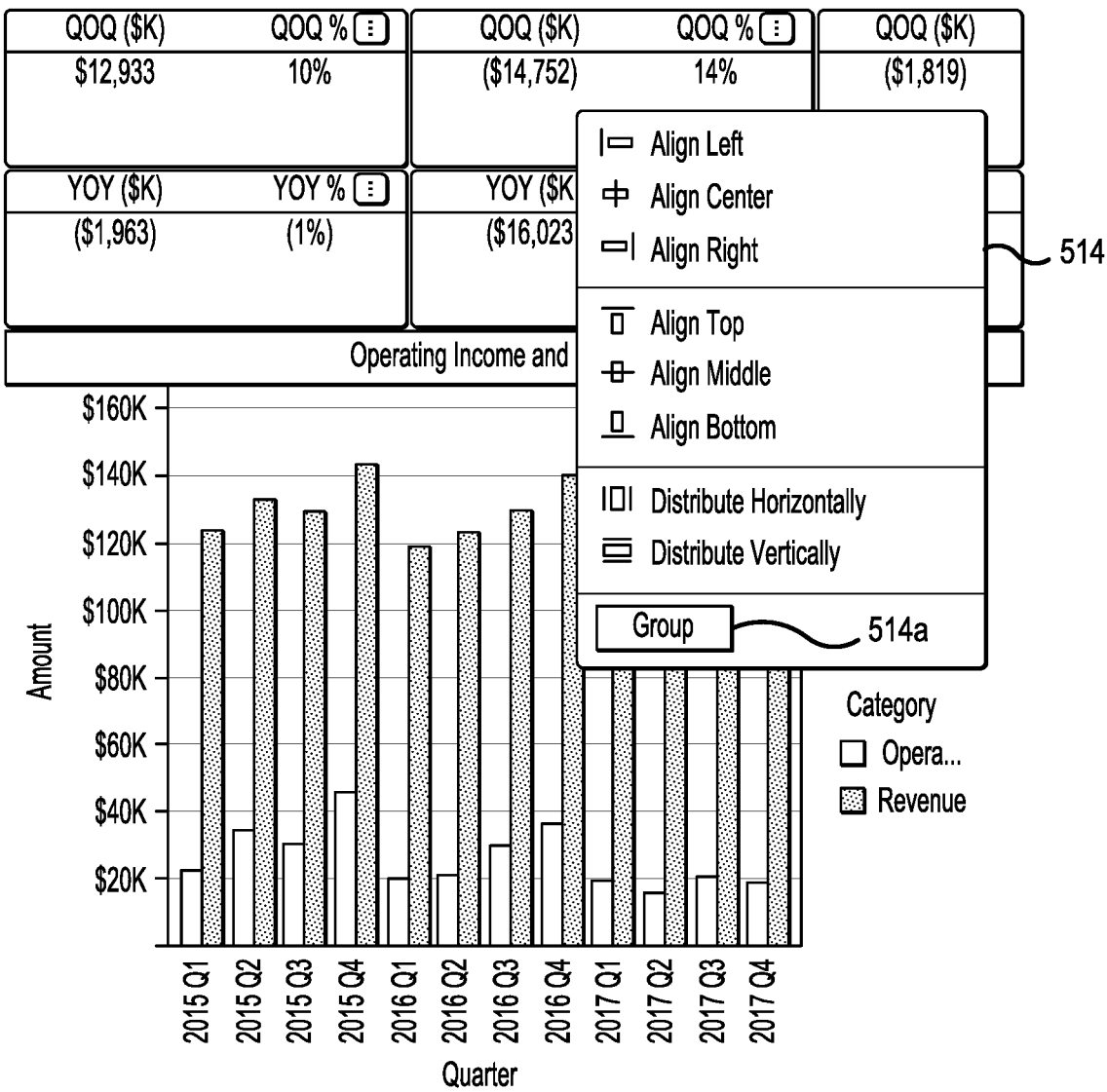

As is illustrated in FIGS. 8A and 8B, when multiple objects are grouped together, the user can select the group as a whole by a single click (e.g., as illustrated in FIG. 8A) or select only one of the objects/visualizations within the group (i.e., the object/visualization on which the cursor is currently hovering) by a double click (e.g., as illustrated in FIG. 8B). That is, the user can select multiple containers and group them together. To access this group function, the user needs to hold on the command button and select the desired containers. The user can then right mouse click to access the drop down menu 514 illustrated in FIG. 8C, which includes a group option 514a. When the user clicks on the group option 514a, the selected containers will be grouped.

Figure 9A:
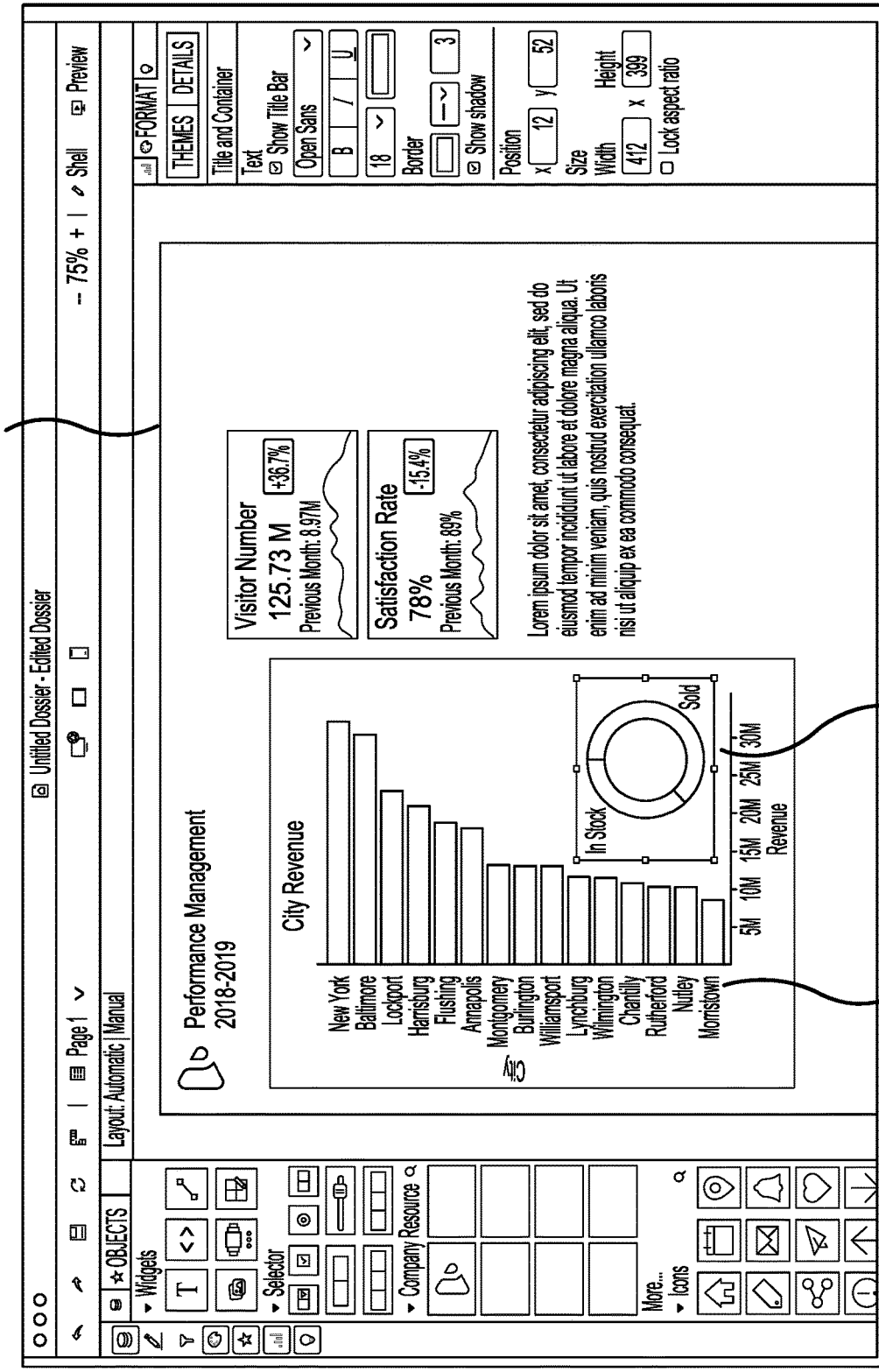

The method and system also allows a user to layer objects/visualizations. That is, if a user wants to add an object/visualization on top of another object, then the objects/visualizations will be layered and auto-grouped. When layered, the lower layers may still be visible, depending on the size of the containers and the degree of transparency of the higher layer. As is illustrated in FIG. 9A, the container 502b including the pie chart is layered with a container 502f including a graph. The relative position of objects/visualizations can be set in a format panel 516. Specifically, as is illustrated in FIG. 9C, the format panel 516 includes an option 516a for defining the position and size of a selected container. In FIG. 9C, the user has selected a data container 518 displaying "Employee Expense Ranking." Using the position and size option 516a in the format panel 516, the user can define the position of the container by setting X and Y axis coordinates and the use can define the size of the container by setting a width and height of the container.

Figure 9B:
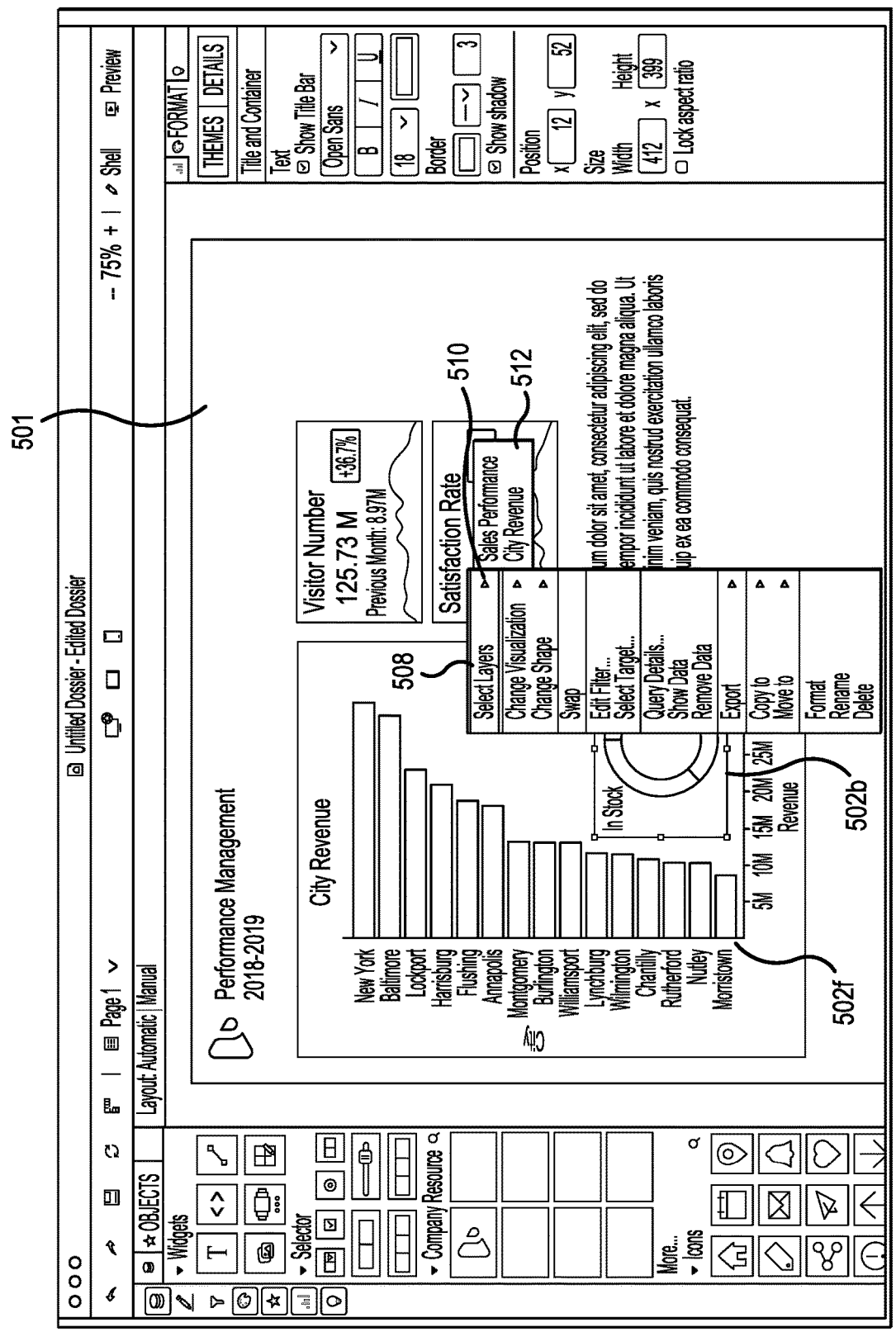
Figure 9C:
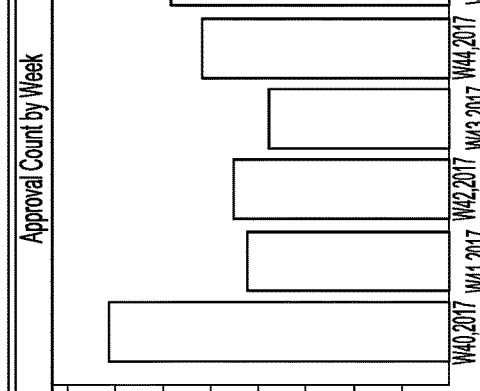

When multiple objects are layered, as in FIG. 9A, the user can right-mouse-click on the top-most object/layer (e.g., in FIG. 9A the container 502b including the pie chart is the top-most layer) to trigger a context menu 508 as illustrated in FIG. 9B. The context menu 508 includes a "Select Layer" option 510. When the user selects the "Select Layer" option 510, a list 512 of layered objects is provided and the user can select one of the layered objects/visualizations from the list 512. When multiple containers are overlapped, there is chance that some containers cannot be easily selected. With the select layer function in the menu, the user can pick the lower layers and do further manipulations (e.g., add data, format the container, etc.). When the user selects an object that is hidden below another object, the hidden object will be anchored (i.e., selected) and illustrated as transparent.

In addition to the above-described flexibility in dossier layout design, the dossier creation method and system, in accordance with certain exemplary embodiments of the present invention, is responsive across different platforms. That is, if a user creates a dossier on a first platform having a first format/size (e.g., on a desktop or laptop computer), the dossier, when viewed on a second platform having a second format/size (e.g., a tablet device, handheld device or mobile telephone, etc.), will be automatically formatted to the format/size of the second platform for easy and proper viewing.

Figure 10:
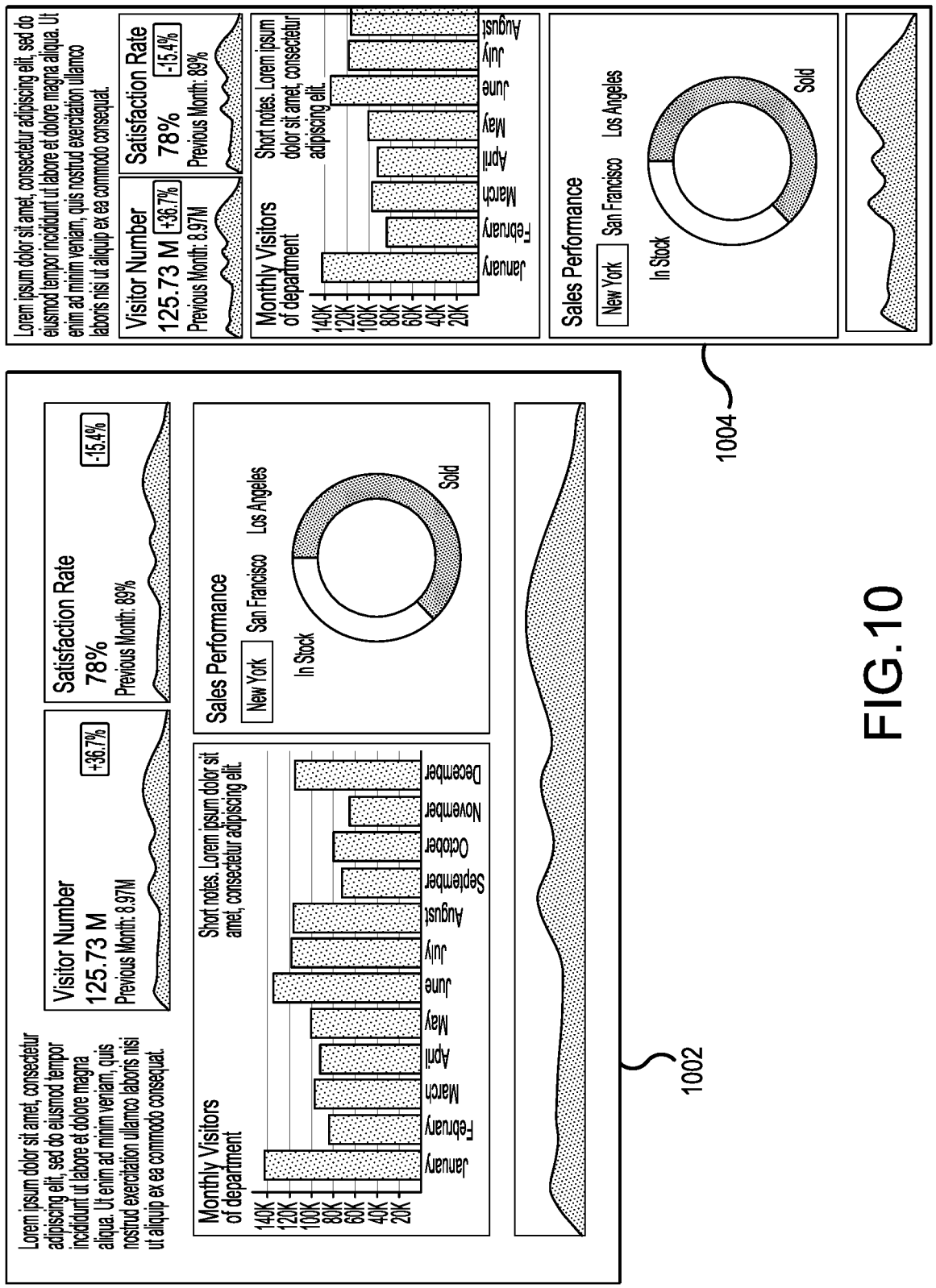
FIG. 10 illustrates a side-by-side comparison of a dossier formatted and displayed on two different platforms according to certain exemplary aspects of the present invention.

For example, FIG. 10 illustrates a side-by-side comparison of a dossier formatted and displayed on two different platforms having different dimensions. The first dossier 1002 is displayed on, for example, a laptop or desktop computer on which the dossier was designed. As is illustrated in FIG. 10, the first dossier 1002 includes a plurality of objects/visualizations arranged horizontally or in an array. The second dossier 1004 is displayed on, for example, a tablet, mobile telephone or other handheld device. The second dossier 1004 is identical to the first dossier 1002 except that it has been automatically formatted to fit the dimensions of the second platform. For example, in FIG. 10, the objects/visualizations in the second dossier 1004 are arranged vertically.

Figure 11:
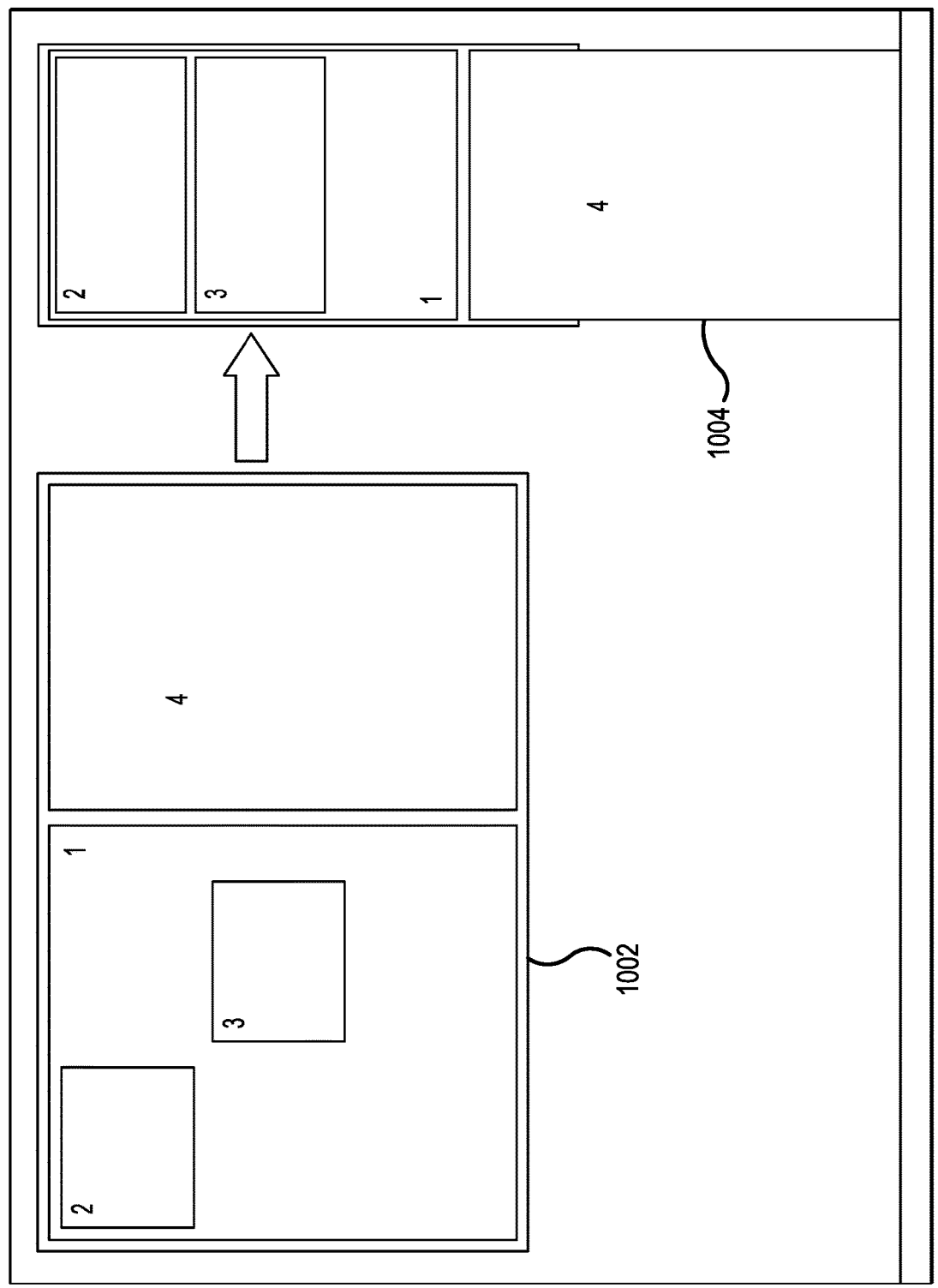
FIGS. 11-20 illustrate a dossier being formatted from a first platform to a second platform according to certain exemplary aspects of the present invention.

The manner in which the objects/visualizations are reformatted and arranged on the second platform are determined by one or more of the following exemplary formatting rules. For example, if there is no group relationship between the containers (objects/visualizations) in the dossier, then the system will treat each container as one separate bounding box and display the containers one by one. As long as there is overlap between multiple containers and 100% of the area of the smaller container is overlapped in the larger container, then the system will maintain the overlap relationship on the responsive view. This is evident in FIG. 10. FIG. 11 further illustrates this concept. FIG. 11 illustrates the first dossier 1002 and the second dossier 1004, of FIG. 10, in a simplified format in accordance with the responsive view feature of the present invention. That is, the objects/visualizations are merely illustrated as four data containers numbered 1, 2, 3 and 4. In the example in FIGS. 10 and 11, each data container (object/visualization) is a separate container and the dossier does not include any groupings. Thus, while the data containers 1, 2, 3 and 4 are arranged in an array in the original dossier 1002, the data containers 1, 2, 3 and 4 are arranged in a vertical stack when the dossier 1004 is displayed on the second platform, which has smaller dimensions than the first platform. For example, referring to the original dossier, the container should be the first container when vertically stacked in the dossier 1004 and the order should be container 1, container 4, container 2 and container 3. The system places the containers in the vertical stack from left to right and then from top to bottom from the top-left corner.

Figure 12:
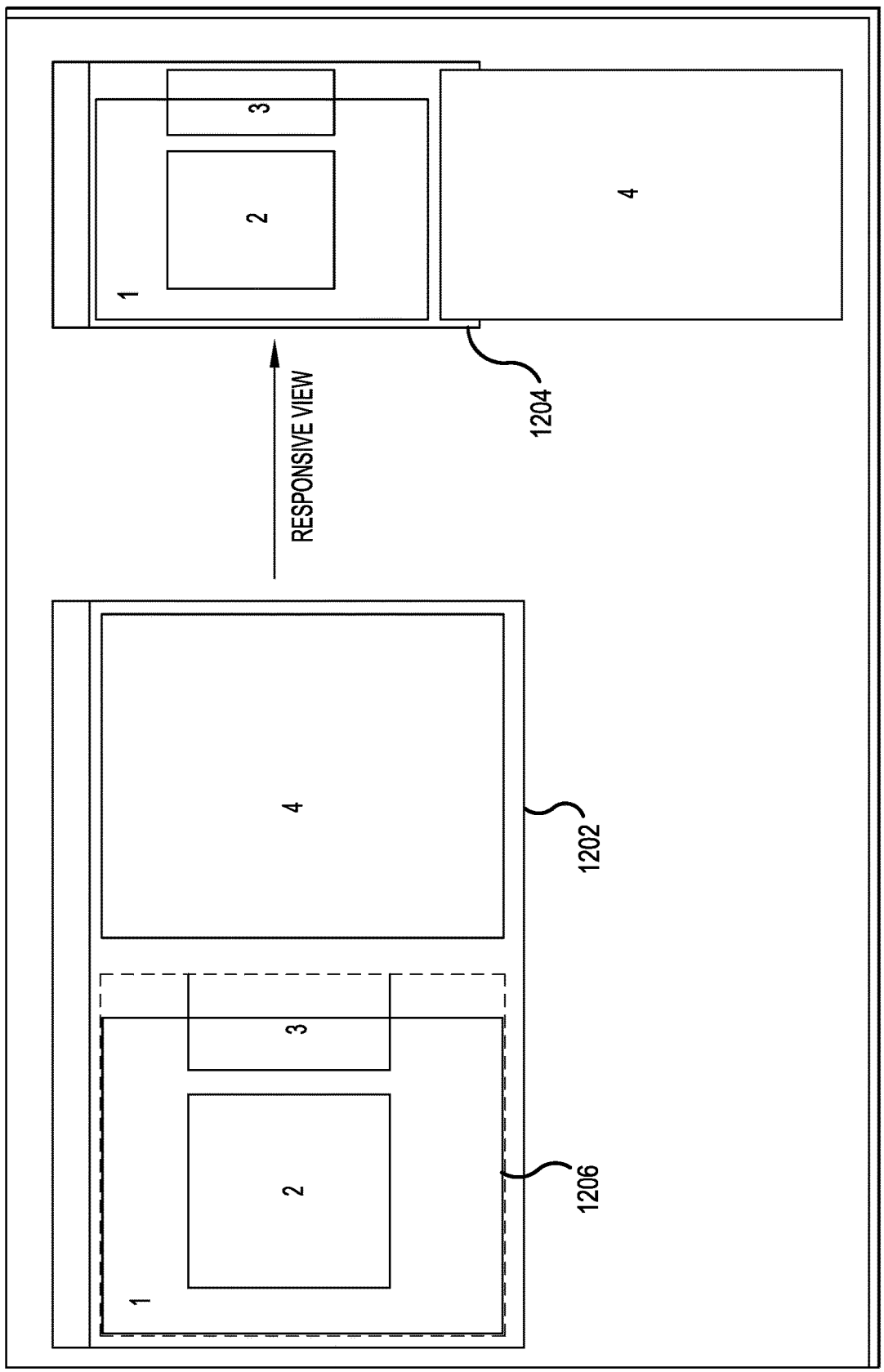
Figure 13:
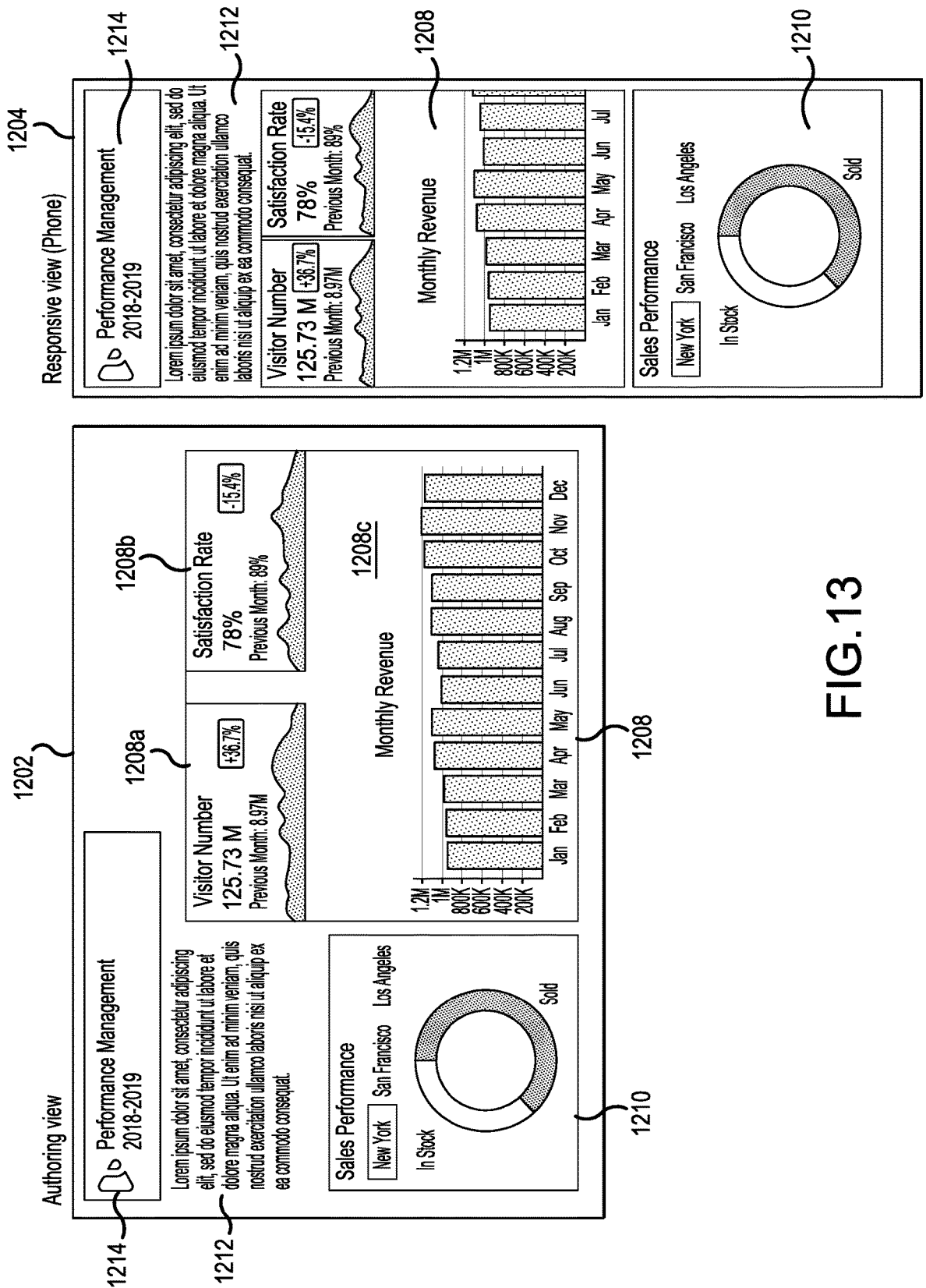

Turning to FIGS. 12 and 13, containers that are grouped are treated differently than the single containers, as discussed with respect to FIGS. 10 and 11. That is, if two or more containers overlap in area more than 50% of the area of the smallest container, then the containers will be treated as one group. If the multiple containers are grouped, then they are treated as one bounding box, including any spacing area between the grouped containers, and are formatted to the dimensions of the second, smaller, platform by width ratio.

FIG. 12 illustrates a simplified, side-by-side comparison of a dossier 1202 displayed on a first platform (e.g., a desktop or laptop computer) and the same dossier 1204 formatted and displayed on a second platform (e.g., a mobile telephone or other handheld device) in accordance with the responsive view feature of the present invention. The objects/visualizations are merely illustrated as four data containers numbered 1, 2, 3 and 4. The four data containers 1, 2, 3 and 4 are arranged in an initial array. In FIG. 12, the data containers 1, 2 and 3 are grouped and contained within a group bounding box 1206. Thus, in accordance with the responsive view features of the present invention, the data containers 1, 2, 3 and 4 are arranged in a vertical stack when the dossier 1204 is displayed on the second platform, which has smaller dimensions than the first platform. In the example in FIG. 12, however, unlike the single container vertical stack in FIGS. 10 and 11, the grouped data containers 1, 2 and 3 maintain their grouped arrangement in the dossier 1204 on the second platform, and the non-grouped data container 4 is stacked, vertically below the grouped data containers 1, 2 and 3. In this case, the width of the data containers 1, 2 and 3 is reduced such that the group containers can be properly fit to the smaller display of the second platform while maintaining their grouping.

This is further illustrated in FIG. 13. The dossier 1202 in FIG. 13 includes a single data container including an image 1214, a single data container including a text image 1212, a single data container including a ring chart 120 and a group of data containers 1208 including a first KPI 1208a, a second KPI 1208b and a graph 1208c. When the dossier 1204 is displayed on the second platform, having smaller dimensions than the first platform, the single containers are all stacked vertically. The group of data containers 1208 are maintained as a group and the first KPI 1208a, the second KPI 1208b and the graph 1208c in the group 1208 maintain their relative positions. The width of the containers in the group 1208 is reduced to fit the dimensions of the second platform.

Figure 14:
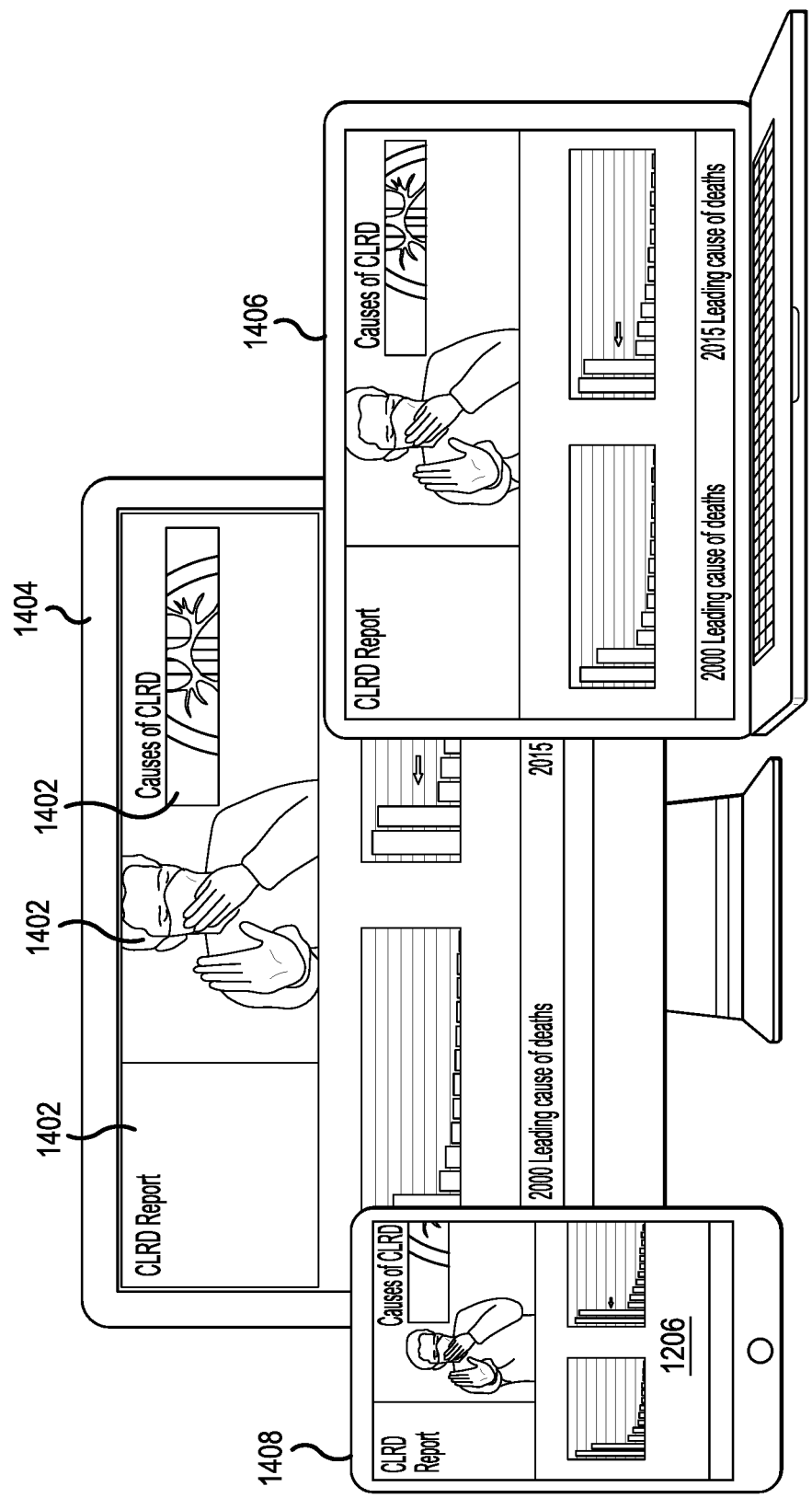

Furthermore, as is illustrated in FIG. 14, for data containers including text, images and/or a KPI, a "fit to content height" rule is applied inside the bounding group and the bounding box height is expanded correspondingly to fully display the content of the data container(s) while fitting the dossier to the dimensions of the second platform. That is, as is illustrated in FIG. 14, the text, image and KPI objects/containers are grouped into a data container group 1402 in the first platform 1404 (e.g., desktop computer). In the platforms having smaller dimensions (e.g., laptop computer 1406 and mobile telephone 1408), the grouping is maintained. Since the width of the displays of the smaller platforms (e.g., laptop computer 1406 and mobile telephone 1408) is smaller than that of the first platform 1404, the height of the bounding box for the group 1402 is increased to accommodate all of the data containers in the group 1402 while also fitting to the dimensions of the smaller platforms (e.g., laptop computer 1406 and mobile telephone 1408). More specifically, if there are two containers in the same row and they are extended to a different height, the height of the shorter of the data containers is enlarged to match the height of the taller of the data containers so that the data containers can be maintained in a same row of the dossier.

Figure 15:
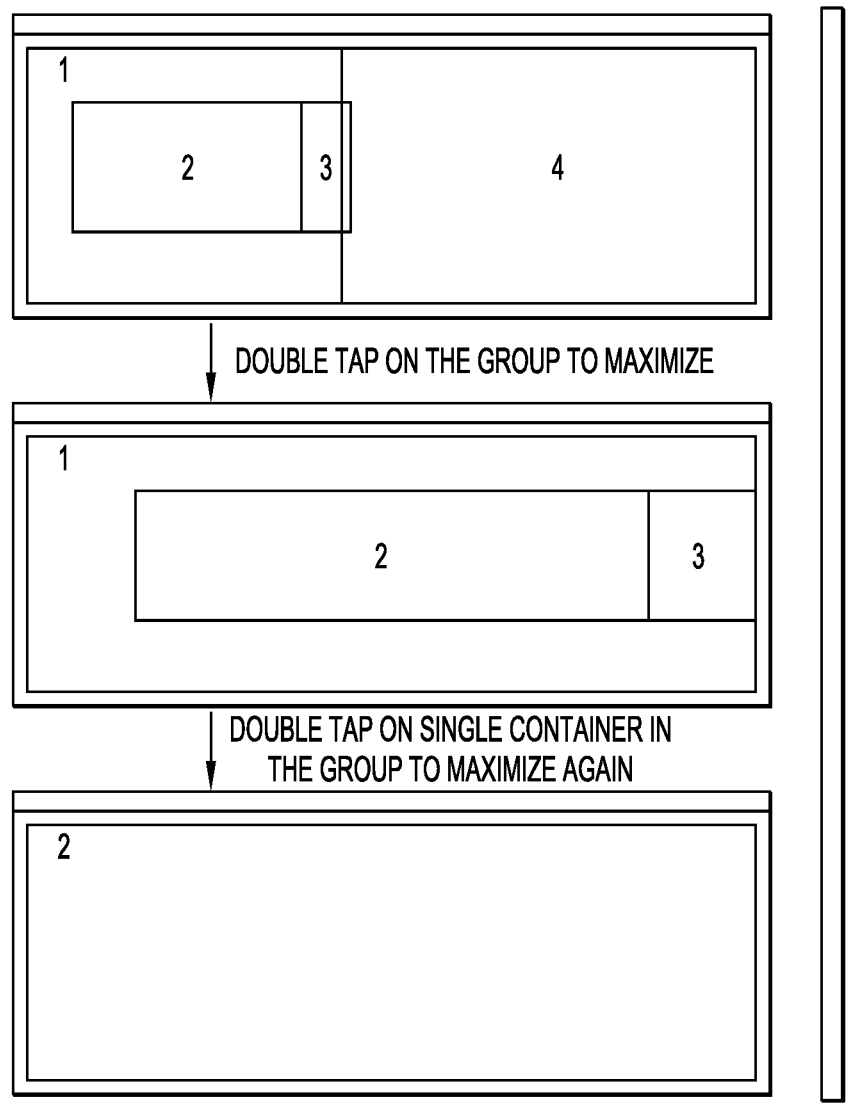

The system allows a user to double tap a container or group of containers to maximize the containers, as illustrated in FIG. 15. For example in FIG. 15, the containers 1, 2 and 3 are grouped as a group container. On a touch screen device, when the user double taps on the group area, the group container will adapt to a full screen mode, with more space to display content and data. If the containers are not in a group, the double tap will only maximize the single container. The user can continue to double tap on one container in the group maximize mode to view the maximized visualization. For example, in the case illustrated in FIG. 14, there is a nested group having data containers 1, 2, 3 and 4. Data containers 1, 2 and 3 are contained in a group and data container 4 is a single container. When the user double taps on the container 4, since there is no large overlap area, the system will only maximize container 4. When the user double taps on container 1, 2 or 3, since there is a large overlap area between the grouped containers 1, 2 and 3, the system will treat them as one bounding box and maximize the group.

Figure 16:
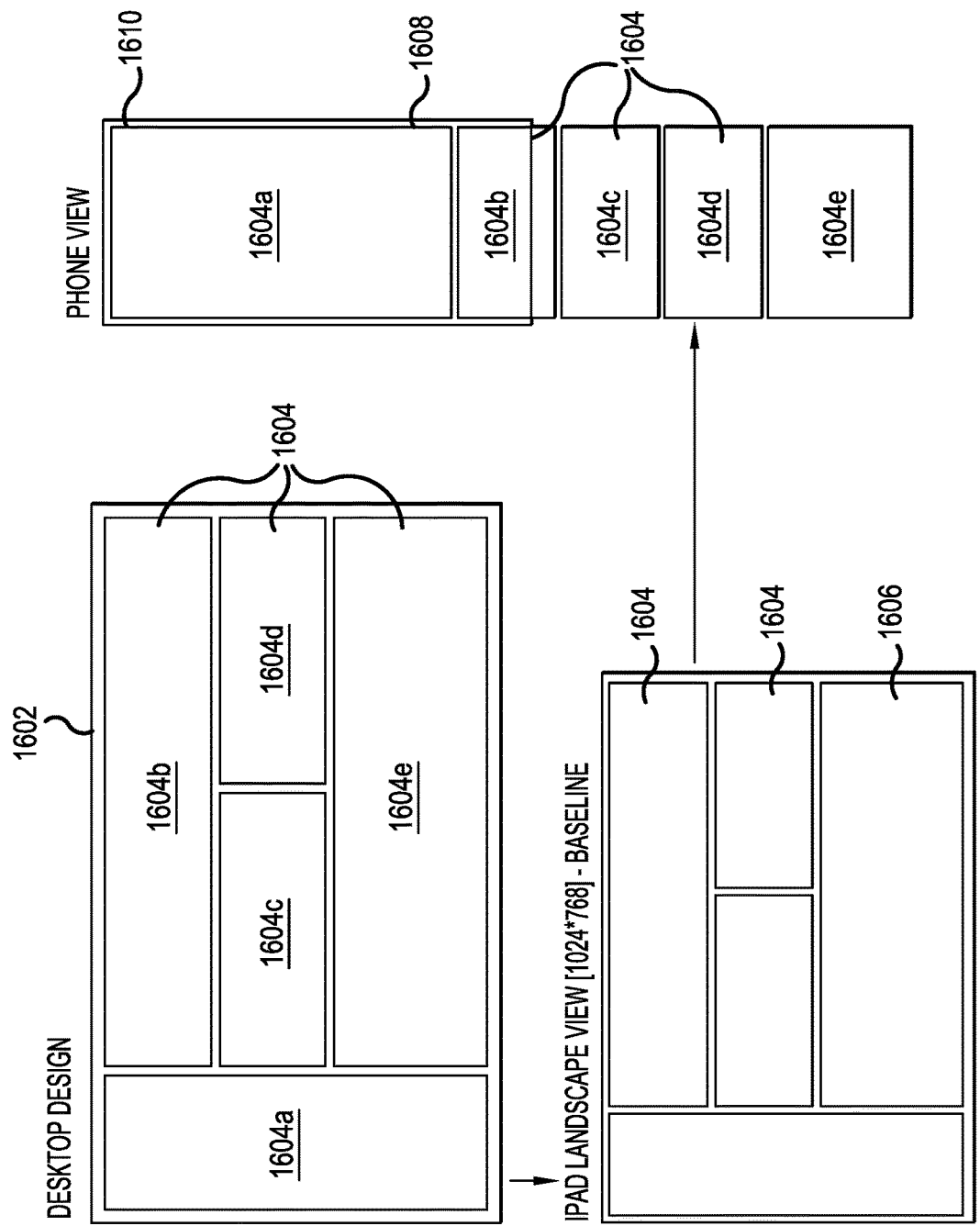

The method and system of the present invention uses one or more formatting rules for formatting a dossier created on a first platform (e.g., a desktop computer) to fit on a second platform (e.g., a mobile telephone). For example, as is illustrated in FIG. 16, a dossier 1602 was created on a desktop computer. The dossier includes a plurality of containers 1604 arranged in an array selected by the dossier author. When the dossier 1602 is viewed on a tablet device, the dossier 1604 has the same layout and arrangement of containers 1604, but the aspect ratio is adjusted. For example, in the example in FIG. 16, the aspect ratio in the dossier 1604 on the tablet device is set at 1024*768. Additionally, the heights of the containers can be adjusted, with a maximum height of any one container being 0.8H, where H is the height of the device display. When the dossier 1606 is displayed on a hand-held mobile device (e.g., cellular telephone), the containers 1604 are placed one-by-one vertically, according to their position in the original dossier 1602 from left to right and top to bottom. The dimensions (e.g., width) of the data containers is adjusted to fit the dimensions of the display 1610 of the hand-held mobile device. As is illustrated in FIG. 16 not all of the data containers in the vertical stack may be displayed at a same time due to the dimensions of the hand-held mobile device. For example, in FIG. 16, only data container 1604a and a portion of data container 1604b are visible within the display 1610 of the hand-held mobile device. To view the additional data containers 1604c, 1604d and 1604e, the user may simply scroll through the dossier.

In addition to the above general formatting rule, the method and system of the present invention applies specific formatting rules for each visualization content type. The specific rules are designed to ensure that all content types are sufficiently readable when a dossier is read on, for example, a hand-held mobile device.

Figure 17:
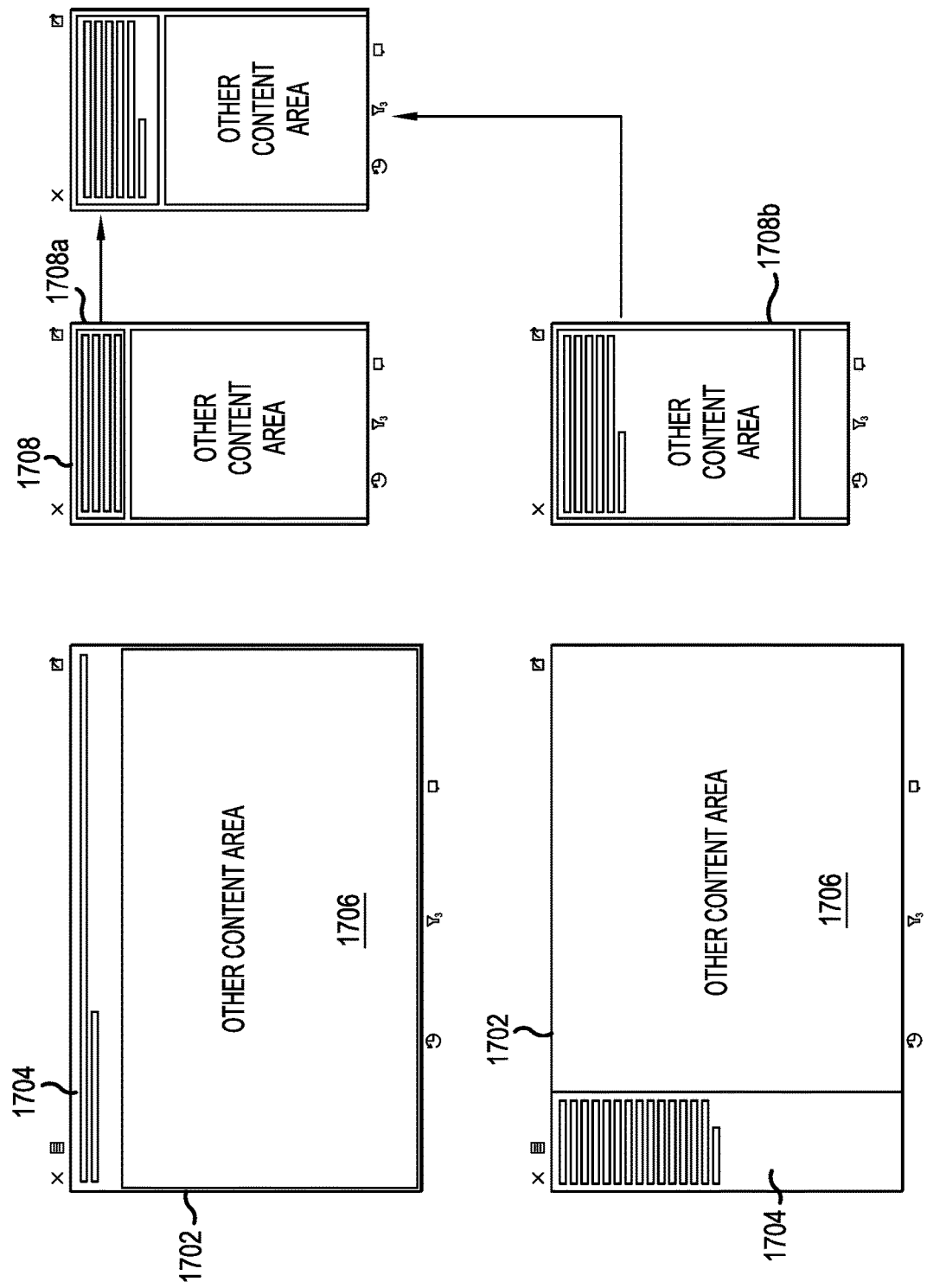

For example, the dossier 1702 illustrated in FIG. 17 includes a first data container 1704 including text and a second data container 1706 including some other form of content/visualization. When the dossier 1702 is first mapped to be displayed on the hand-held mobile device 1708, the general mapping rule described above is followed such that the data containers 1704 and 1706 are stacked vertically. The text 1705 or container 1704 must then be adjusted. For example, if the height of the container (1708a) after mapping is shorter than the height of the paragraph of text, then the height of the paragraph of text is used and the height of the data container is adjusted to meet the height of the paragraph of text. If, however, the container height (1708b) after mapping is higher than the height of the paragraph of text, the the height of the data container is adjusted to meet the height of the paragraph of text. Furthermore, if it is possible to display all of the text within the container, then the container height is set as the height of the paragraph of text plus a padding space above and below the paragraph of text. Alternatively, if the height of the paragraph excess 0.8H, then not all of the text will be initially displayed and the user will need to scroll on the display of the hand-held mobile device to view all of the text.

Figure 18:
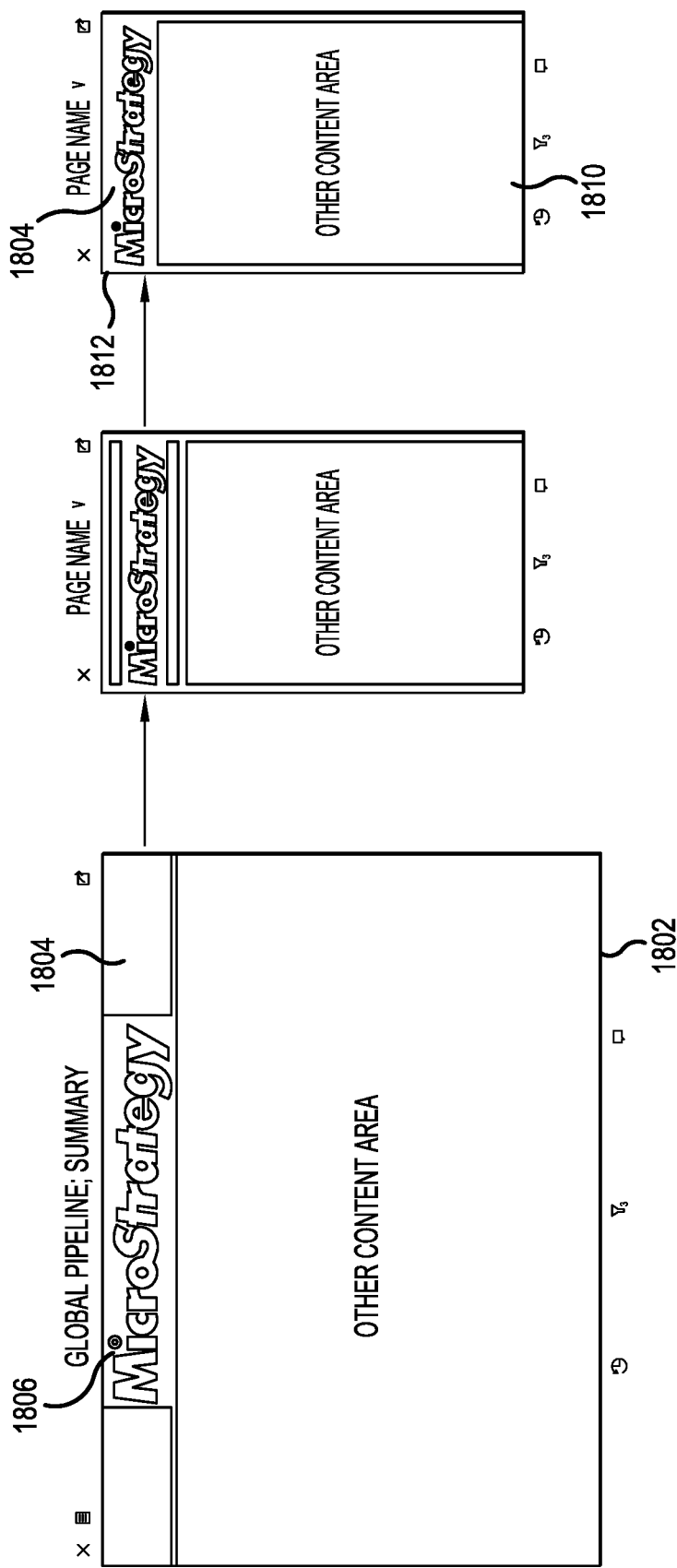

For visualizations including images, a user can select either a "fit to container option" or a "fill container option." The "fit to container option" or a "fill container option" may be selected by the user in a drop down menu in the original dossier. FIG. 18 illustrates the "fit to container option." Indeed, as is illustrated in FIG. 18, the "MicroStrategy" image 1806 is included in a top container 1804 in the dossier 1802. When the dossier 1802 is illustrated on a hand-held mobile device 1810, the general container mapping rules are applied and the image 1806 is scaled to fit the new container 1812. If, after mapping and scaling, there are any blank spaces at the top or bottom of the image 1804, then the height of the new data container 1812 is reduced to fit to the image height. If, however, there are any blank spaces to the left or right of the image 1804, then the system will leave the spaces.

Figure 19:
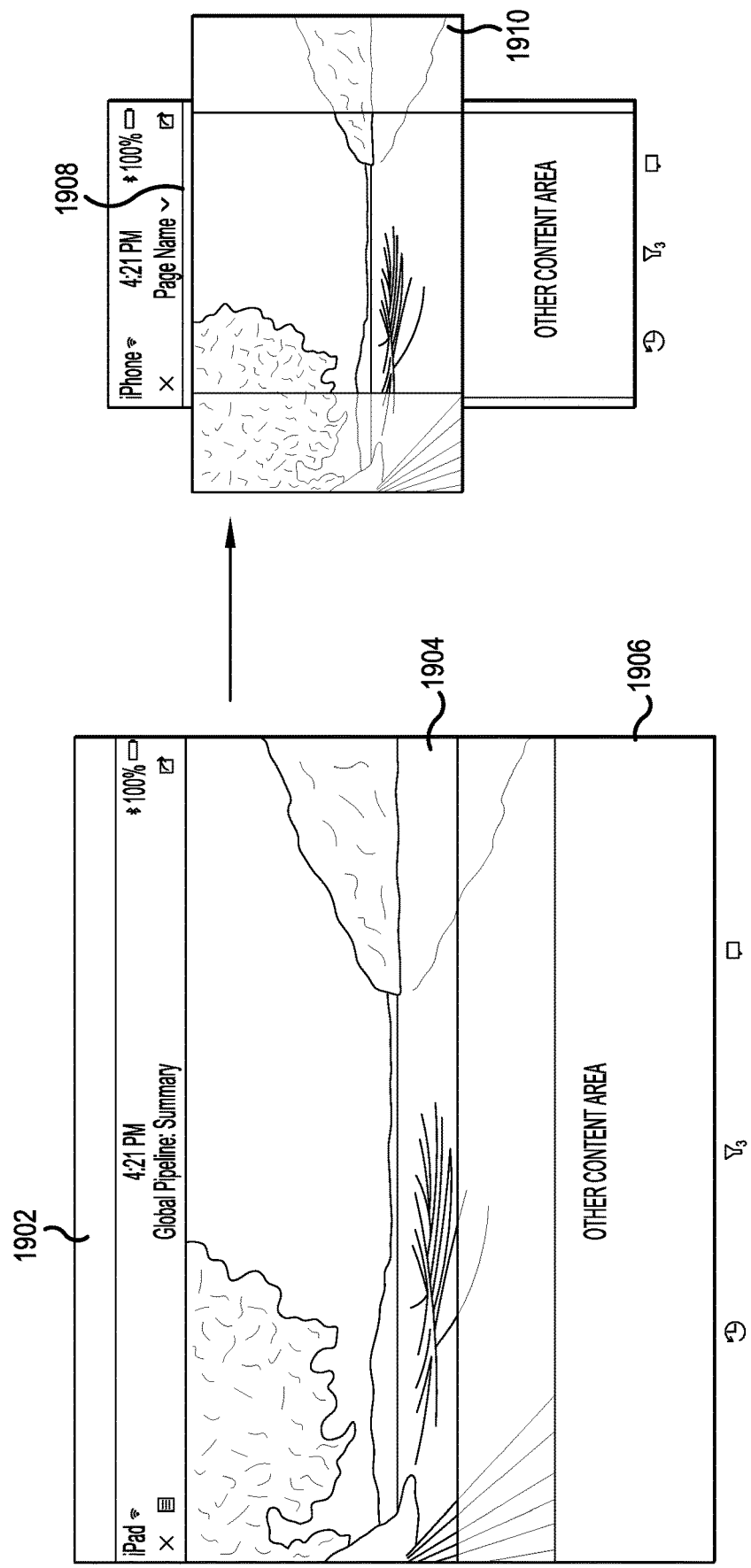

FIG. 19 illustrates the "fill container option." In the "fill container option," the data containers 1904 and 1906 in the original dossier 1902 are mapped to the display 1908 on the hand-held device according to the general mapping rule. Then, the image in the image data container 1904 is horizontally and/or vertically cropped to fill the new data container 1910.

Figure 20:
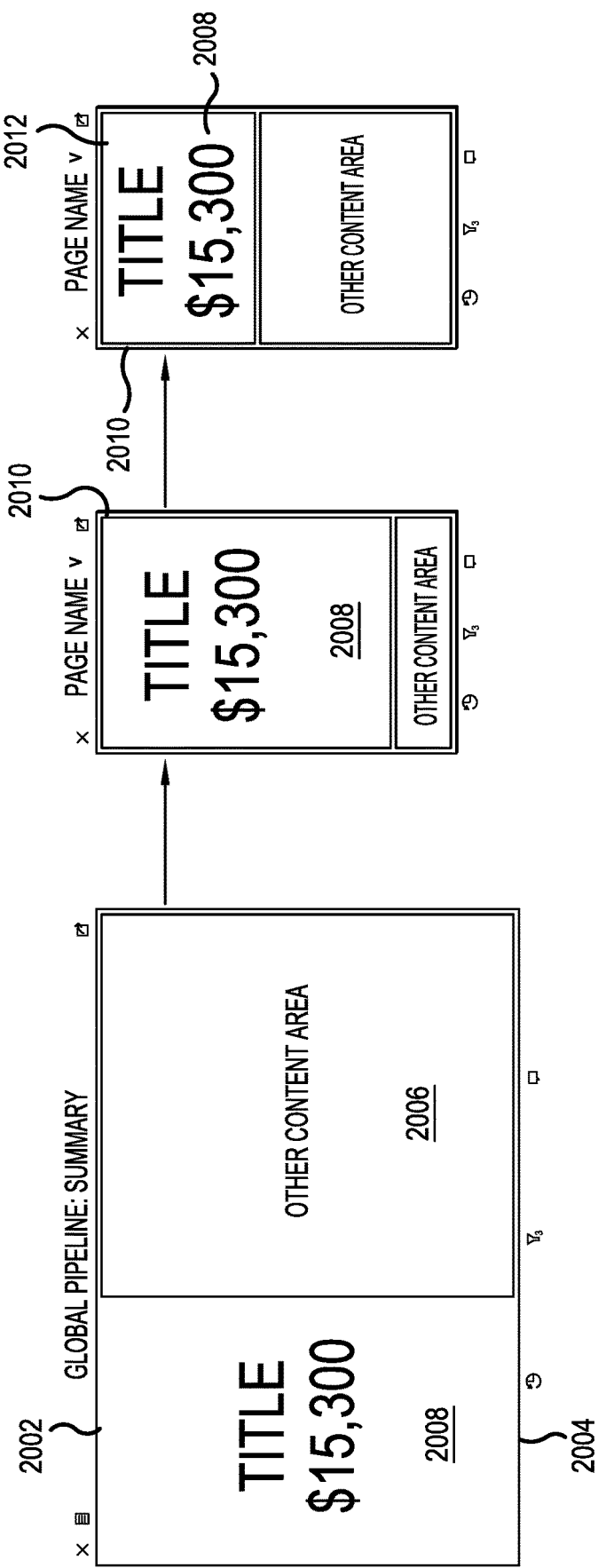

FIG. 20 illustrates an example of a dossier 2002 having a first data container 2004 and a second data container 2006. The first data container 2004 includes a KPI widget 2008. Again, when the data containers are mapped to the display of the hand-held mobile device 2010, the general mapping rule is applied. The vertical space of the KPI widget 2008 is then reduced to fit the content of the KPI widget 2008 to the new data container 2012. If, after the KPI widget 2008 is resized, the width of the container is not sufficient to display all of the text in the KPI widget 2008, then the system will resize the font size to display the entire KPI widget 2008.

Accordingly, the present invention provides a report building system and method for business analytics that maintains responsiveness, can accommodate constantly updating data while increasing user flexibility in layout design. Furthermore, the desktop designed dossiers can be easily converted, automatically, to fit and be properly viewed on another platform (e.g., on a smaller display screen of a mobile telephone) in an easy, flexible and responsive manner. Indeed, the designer merely needs to design the dossier on a desktop computer and the same dossier can then be properly displayed across all platforms without any additional work by the designer. The system (and method) of the present invention would all of the responsive views to fit all other platforms.

While the invention has been described in terms of several exemplary embodiments, those skilled in the art will recognize that the invention can be practiced with modification within the spirit and scope of the appended claims.

Further, it is noted that, Applicant's intent is to encompass equivalents of all claim elements, even if amended later during prosecution.

What is claimed is:

1. A method, comprising:
    retrieving a dataset from a database;
    creating, on a first platform, a report including a visual representation of the dataset, the visual representation comprising multiple data containers, said creating the report comprising:
        user placement of visual representations to the report; and
        automatically correcting placement issues when positioning the visual representations in the report, wherein when the user adds a new visualization that overlaps an existing visualization, the new visualization is automatically resized to fit within an open space in the report, and wherein when the user adds the new visualization that overlaps the existing visualization and there is insufficient open space in the report to resize the new visualization, the existing visualization and the new visualization will automatically be grouped and will remain overlapped with the new visualization being positioned on top of the existing visualization;
        wherein when the existing visualization and the new visualization will remain overlapped the user may resize the existing visualization and/or the new visualization,
        wherein when the user resizes the existing visualization and/or the new visualization, the resized visualization will snap-fit with respect to another visualization, and
        wherein when the user resizes the existing visualization and/or the new visualization, once the existing visualization and/or the new visualization contacts another existing visualization, the existing visualization and/or the new visualization being resized will be automatically stopped from resizing and the alignment guidelines will automatically be displayed, the alignment guidelines appearing as lines on the report and comprising align left, align center, align right, align top, align middle and align bottom;
    automatically formatting the report to a second platform, said automatically formatting the report comprising changing an arrangement of the multiple data containers to fit the second platform, said changing the arrangement being conducted based on the following formatting rules:
        if no group relationship between the multiple data containers exists, treating each of the multiple data containers as one separate bounding box and displaying the multiple data containers one by one;
        if an overlap exists between the multiple data containers, maintaining the overlap on the second platform; and
        if an overlap exists between two or more of the multiple data containers, treating the two or more of the multiple data containers as one bounding box including any spacing area between the multiple data containers and formatting the multiple data containers in the one bounding box to dimensions of the second platform by width ratio,
        wherein single data containers, with no group relationship, are stacked vertically on the second platform and grouped data containers are maintained as a group and maintain their relative positions; and
    displaying the report on a graphical user interface of the second platform.

2. The method according to claim 1, wherein the first platform is a desktop computer or a laptop computer and the second platform is a tablet device or a handheld mobile device.

3. The method according to claim 1, wherein the first platform is a desktop computer and the second platform is a mobile telephone.

4. The method according to claim 1, wherein the first platform has a graphical user interface, and
    wherein dimensions of the graphical user interface of the first platform are different than dimensions of the graphical user interface of the second platform.

5. The method according to claim 1, wherein said automatically formatting comprises changing the arrangement of said multiple data containers based on dimensions of the graphical user interface of said second platform.

6. The method according to claim 1, wherein, on said first platform, the multiple data containers are arranged in an array, and
    wherein said automatically formatting comprises arranging said multiple data containers on the graphical user interface of said second platform in a vertical stack.

7. The method according to claim 1, wherein the two or more of the multiple data containers will be treated as one bounding box if the two or more of the multiple data containers overlap in area by more than 50% of an area of a smaller one of the two or more of the multiple data containers.

8. The method according to claim 1, wherein the formatting rules further comprise maintaining a grouped arrangement of data containers when two or more of the multiple data containers are grouped on the first platform.

9. The method according to claim 1, wherein said formatting rules further comprise, for data containers including text, an image or a key performance indicator, a fit-to-height rule.

10. The method according to claim 2, wherein the second platform is the tablet device, and
    wherein, on the tablet device, the arrangement of the multiple data containers is maintained, and an aspect ratio of the report is adjusted.

11. The method according to claim 2, wherein the second platform is the hand-held mobile device, and
    wherein, on the hand-held mobile device, the multiple data containers are placed one-by-one vertically according to a position of each of the multiple data containers on the first platform from left to right and top to bottom.

12. The method according to claim 1, wherein said formatting rules further comprise, for data containers including an image, a fit to container option or a filler container option.

13. The method according to claim 1, wherein the user may select the alignment guidelines to be displayed from a drop down menu.

14. The method according to claim 1, further comprising layering the visual representations,
    wherein lower layers of the visual representations are visible depending on a size of the visual representations and a degree of transparency of an upper-most layer.

15. The method according to claim 14, wherein when the visual representations are layered, the user is able to right-mouse-click on the upper-most layer to generate a context menu, and wherein the context menu provides a list of user-selectable layered visualizations.

16. A non-transitory computer processor-readable storage medium storing instructions configured for execution by a computer for:

retrieving a dataset from a database;

creating, on a first platform, a report including a visual representation of the dataset, the visual representation comprising multiple data containers, said creating the report comprising:

user placement of visual representations to the report; and automatically correcting placement issues when positioning the visual representations in the report, wherein when the user adds a new visualization that overlaps an existing visualization, the new visualization is automatically resized to fit within an open space in the report, and wherein when the user adds the new visualization that overlaps the existing visualization and there is insufficient open space in the report to resize the new visualization, the existing visualization and the new visualization will automatically be grouped and will remain overlapped with the new visualization being positioned on top of the existing visualization;

wherein when the existing visualization and the new visualization will remain overlapped the user may resize the existing visualization and/or the new visualization, wherein when the user resizes the existing visualization and/or the new visualization, the resized visualization will snap-fit with respect to another visualization, and wherein when the user resizes the existing visualization and/or the new visualization, once the existing visualization and/or the new visualization contacts another existing visualization, the existing visualization and/or the new visualization being resized will be automatically stopped from resizing and the alignment guidelines will automatically be displayed, alignment guidelines appearing as lines on the report and comprising align left, align center, align right, align top, align middle and align bottom;

automatically formatting the report to a second platform, said automatically formatting the report comprising changing an arrangement of the multiple data containers to fit the second platform, said changing the arrangement being conducted based on the following formatting rules:

if no group relationship between the multiple data containers exists, treating each of the multiple data containers as one separate bounding box and displaying the multiple data containers one by one;

if an overlap exists between the multiple data containers, maintaining the overlap on the second platform; and if an overlap exists between two or more of the multiple data containers, treating the two or more of the multiple data containers as one bounding box including any spacing area between the multiple data containers and formatting the multiple data containers in the one bounding box to dimensions of the second platform by width ratio, wherein single data containers, with no group relationship, are stacked vertically on the second platform and grouped data containers are maintained as a group and maintain their relative positions; and displaying the report on a graphical user interface of the second platform.

17. A system, comprising:

a database storing a dataset;

a first platform comprising a processor configured to create a report including a visual representation of the dataset, the visual representation comprising multiple data containers, wherein the reported is created by:

user placement of visual representations to the report; and automatically correcting placement issues when positioning the visual representations in the report, wherein when the user adds a new visualization that overlaps an existing visualization, the new visualization is automatically resized to fit within an open space in the report, and wherein when the user adds the new visualization that overlaps the existing visualization and there is insufficient open space in the report to resize the new visualization, the existing visualization and the new visualization will automatically be grouped and will remain overlapped with the new visualization being positioned on top of the existing visualization;

wherein when the existing visualization and the new visualization will remain overlapped the user may resize the existing visualization and/or the new visualization, wherein when the user resizes the existing visualization and/or the new visualization, the resized visualization will snap-fit with respect to another visualization, and wherein when the user resizes the existing visualization and/or the new visualization, once the existing visualization and/or the new visualization contacts another existing visualization, the system will automatically stop the existing visualization and/or the new visualization being resized from resizing and automatically display the alignment guidelines, the alignment guidelines appearing as lines on the report and comprising align left, align center, align right, align top, align middle and align bottom; and a second platform comprising a graphical user interface configured to display the report, wherein the report is automatically formatted to the second platform when displayed on the second platform, said report being automatically formatted by changing an arrangement of the multiple data containers to fit the second platform, said changing the arrangement being conducted based on the following formatting rules:

if no group relationship between the multiple data containers exists, treating each of the multiple data containers as one separate bounding box and displaying the multiple data containers one by one;

if an overlap exists between the multiple data containers, maintaining the overlap on the second platform; and if an overlap exists between two or more of the multiple data containers, treating the two or more of the multiple data containers as one bounding box including any spacing area between the multiple data containers and formatting the multiple data containers in the one bounding box to dimensions of the second platform by width ratio, wherein single data containers, with no group relationship, are stacked vertically on the second platform and grouped data containers are maintained as a group and maintain their relative positions.

* * * * *